US011336991B2

(12) United States Patent
Li et al.

(10) Patent No.: US 11,336,991 B2
(45) Date of Patent: May 17, 2022

(54) LOUDSPEAKER APPARATUS

(71) Applicant: SHENZHEN SHOKZ CO., LTD., Guangdong (CN)

(72) Inventors: Yongjian Li, Shenzhen (CN); Haofeng Zhang, Shenzhen (CN); Fen You, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 0 days.

(21) Appl. No.: 17/169,586

(22) Filed: Feb. 8, 2021

(65) Prior Publication Data
US 2021/0168484 A1 Jun. 3, 2021

Related U.S. Application Data

(63) Continuation of application No. PCT/CN2019/102404, filed on Aug. 24, 2019.

(30) Foreign Application Priority Data

Jan. 5, 2019 (CN) .......................... 201910009907.7

(51) Int. Cl.
*H04R 1/10* (2006.01)
*H04R 1/06* (2006.01)
(Continued)

(52) U.S. Cl.
CPC ........... *H04R 1/1075* (2013.01); *H04R 1/023* (2013.01); *H04R 1/06* (2013.01); *H04R 1/1016* (2013.01);
(Continued)

(58) Field of Classification Search
CPC combination set(s) only.
See application file for complete search history.

(56) References Cited

U.S. PATENT DOCUMENTS 10,950,217 B1 * 3/2021 Dong ................. G02B 27/0176
11,197,082 B2 * 12/2021 Igarashi ............... H04R 1/1016
(Continued)

FOREIGN PATENT DOCUMENTS

| CN | 202486645 U | 10/2012 |
|----|-------------|---------|
| CN | 105101020 A | 11/2015 |

(Continued)

OTHER PUBLICATIONS

International Search Report in PCT/CN2019/102404 dated Nov. 21, 2019, 8 pages.
(Continued)

*Primary Examiner* — Angelica M McKinney
(74) *Attorney, Agent, or Firm* — Metis IP LLC

(57) ABSTRACT

A loudspeaker apparatus may include a circuit housing accommodating a control circuit or a battery; an ear hook and a rear hook connected to both ends of the circuit housing, respectively. The ear hook may be at least partially covered by a first protective housing. The rear hook may be at least partially covered by a second protective housing. The first protective housing and the second protective housing at least partially cover a periphery of the circuit housing from both ends of the circuit housing in a sleeve manner, respectively. The loudspeaker apparatus can avoid damage to the control circuit or the battery caused by high temperature.

20 Claims, 16 Drawing Sheets

(51) Int. Cl.
*H04R 9/06* (2006.01)
*H04R 5/033* (2006.01)
*H04R 1/02* (2006.01)
*H04R 9/02* (2006.01)

(52) U.S. Cl.
CPC ......... *H04R 1/1025* (2013.01); *H04R 1/1041* (2013.01); *H04R 1/1066* (2013.01); *H04R 5/0335* (2013.01); *H04R 9/025* (2013.01); *H04R 9/06* (2013.01); *H04R 2420/07* (2013.01)

(56) References Cited

U.S. PATENT DOCUMENTS

| | | | |
|---|---|---|---|
| 2014/0185822 A1* | 7/2014 | Kunimoto | H04R 1/24 381/74 |
| 2018/0098153 A1 | 4/2018 | Jan | |
| 2020/0336824 A1 | 10/2020 | Zheng | |
| 2021/0067862 A1 | 3/2021 | Li et al. | |

FOREIGN PATENT DOCUMENTS

| | | |
|---|---|---|
| CN | 105472511 A | 4/2016 |
| CN | 205282582 U | 6/2016 |
| CN | 106604174 A | 4/2017 |
| CN | 206360059 U | 8/2017 |
| CN | 207010974 U | 2/2018 |
| CN | 207039848 U | 2/2018 |
| CN | 207070281 U | 3/2018 |
| CN | 107948883 A | 4/2018 |
| CN | 108091794 A | 5/2018 |
| CN | 108873374 A | 11/2018 |
| CN | 208258051 U | 12/2018 |
| CN | 208299971 U | 12/2018 |
| CN | 209184767 U | 7/2019 |
| JP | 2018157259 A | 10/2018 |
| KR | 101934229 B1 | 12/2018 |

OTHER PUBLICATIONS

International Search Report in PCT/CN2019/102403 dated Nov. 21, 2019, 7 pages.
International Search Report in PCT/CN2019/102405 dated Nov. 22, 2019, 8 pages.

* cited by examiner

3100

3700

US 11,336,991 B2

LOUDSPEAKER APPARATUS

CROSS-REFERENCE TO RELATED APPLICATIONS

This application is a continuation of International Application No. PCT/CN2019/102404, filed on Aug. 24, 2019, which claims priority of the Chinese Application No. 201910009907.7, filed on Jan. 5, 2019, the contents of each of which are incorporated herein by reference.

TECHNICAL FIELD

The present disclosure relates to the loudspeaker apparatus field, and more particularly, relates to a sleeve-type design of a loudspeaker apparatus.

BACKGROUND

At present, a loudspeaker apparatus (e.g., headphones, MP3 players, etc.) has become an important item and been widely used (e.g., for playing music, answering calls, etc.) in daily lives. Therefore, a loudspeaker apparatus with improved quality (e.g., a sound quality) is one of the developing direction of the loudspeaker apparatus. During a molding stage of the loudspeaker apparatus, a circuit housing for accommodating a control circuit or a battery may be integrated with a protective sleeve disposed on the periphery of the circuit housing. However, if the circuit housing is integrated with the protective sleeve, a high-temperature environment may cause damage to the control circuit or the battery disposed in the circuit housing, which may affect the quality of the loudspeaker apparatus.

SUMMARY

An embodiment of the present specification provides a loudspeaker apparatus. The loudspeaker apparatus may include at least one speaker. The speaker may include an earphone core and an earphone core housing. The earphone core housing may include a housing panel facing a human body and a housing back opposite to the housing panel. The speaker may further include at least one key module. The loudspeaker apparatus may include a support connector fixedly connected to the earphone core housing for contacting a head of the human body. The support connector may include a control circuit or a battery. The control circuit or the battery may drive the earphone core to vibrate to generate sound. A vibration of the earphone core may result in vibrations of the housing panel and the housing back. The vibration of the housing panel may have a first phase, and the vibration of the housing back may have a second phase. When vibration frequencies of the housing panel and the housing back are in a range of 2000 Hz to 3000 Hz, an absolute value of a difference between the first phase and the second phase may be less than 60 degrees.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
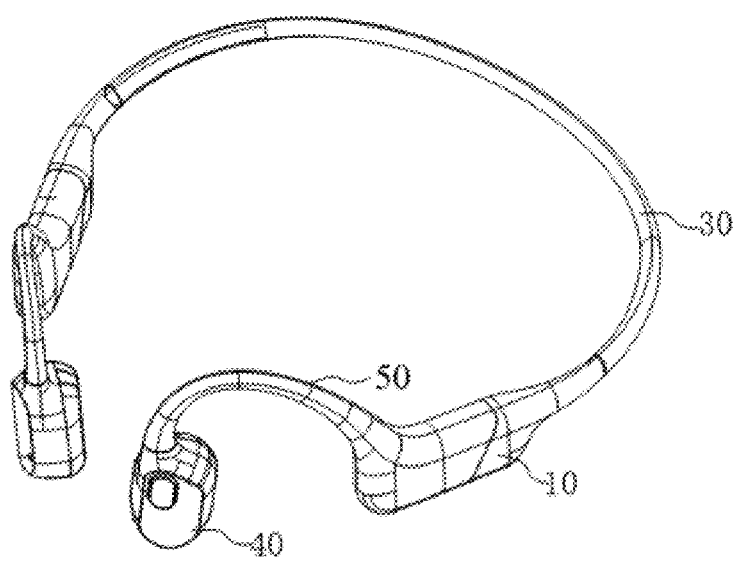
FIG. 1 is a schematic diagram illustrating an exemplary loudspeaker apparatus according to some embodiments of the present disclosure.

In order to illustrate the technical solutions related to the embodiments of the present disclosure, a brief introduction of the drawings referred in the description of the embodiments is provided below. Obviously, drawings described below are only some examples or embodiments of the present disclosure. Those skilled in the art may apply the present disclosure to other similar scenarios according to these drawings without further creative efforts. It should be understood that these embodiments are only provided for those skilled in the art to practice the application, but not intended to limit the scope of the present disclosure. The same numeral in the drawings refers to the same structure or operation, unless it can be obviously obtained from the context or the context illustrates otherwise.

As used in the disclosure and the appended claims, the singular forms "a," "an," and "the" include plural referents unless the content clearly dictates otherwise. In general, the terms "comprise" and "include" merely prompt to include steps and elements that have been clearly identified, and these steps and elements do not constitute an exclusive listing. The methods or devices may also include other steps or elements. The term "based on" is "based at least in part on". The term "one embodiment" means "at least one embodiment"; the term "another embodiment" means "at least one other embodiment". Related definitions of other terms will be given in the description below. In the following, without loss of generality, in describing the present disclosure regarding conduction-related technologies, the description of the "loudspeaker apparatus" or "loudspeaker" will be used. This description is only a form of conduction application. For those skilled in the art, the "loudspeaker apparatus" or "loudspeaker" may also be replaced by other similar words, such as "sound generation apparatus", "hearing aid device" or "speaker". In fact, the various implementations in the present disclosure may be easily applied to other acoustic devices. For example, for those skilled in the art, after understanding the basic principles of loudspeaker apparatus, it is possible to make various modifications and alterations to the structure of and/or methods relating to the loudspeaker apparatus without departing from this principle. Merely by way of example, an ambient sound acquisition and processing function may be added to the loudspeaker apparatus, so that the loudspeaker apparatus may realize the function of a hearing aid. For example, a microphone may detect an ambient sound of the user/wearer, process the ambient sound according to a certain algorithm, and transmit the processed ambient sound (or a generated electrical signal representing the processed ambient sound) to a speaker. That is, the loudspeaker apparatus may be modified to include the function of detecting an ambient sound, a sound may be transmitted to the user/wearer through the speaker after certain signal processing, thereby realizing the functions of the hearing aid and the loudspeaker apparatus simultaneously. For example, the algorithm mentioned herein may include a noise cancellation algorithm, an automatic gain control algorithm, an acoustic feedback suppression algorithm, a wide dynamic range compression algorithm, an active environment recognition algorithm, an active noise reduction algorithm, a directional processing algorithm, a tinnitus processing algorithm, a multi-channel wide dynamic range compression algorithm, an active howling suppression algorithm, a volume control algorithm, or the like, or any combination thereof.

Figure 2:
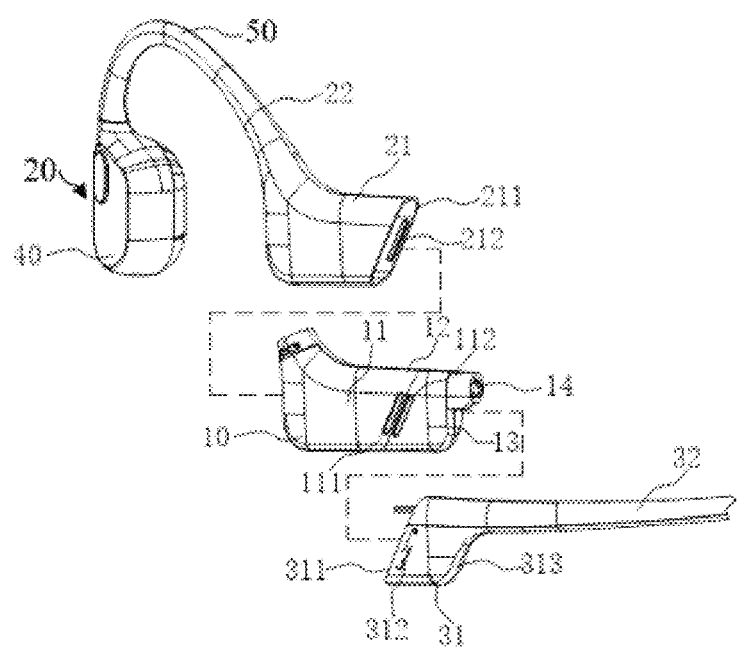
FIG. 2 is a schematic diagram illustrating an exploded view of a portion of a loudspeaker apparatus according to some embodiments of the present disclosure.
Figure 3:
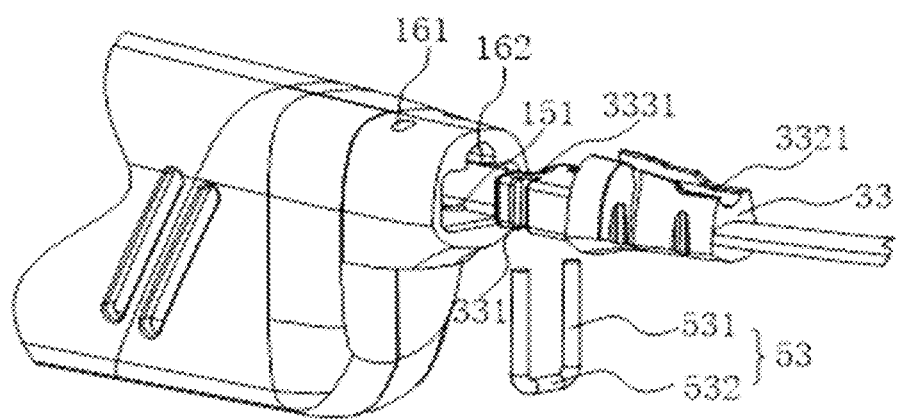
FIG. 3 is a schematic diagram illustrating an exploded view of a portion of a loudspeaker apparatus according to some embodiments of the present disclosure.
Figure 4:
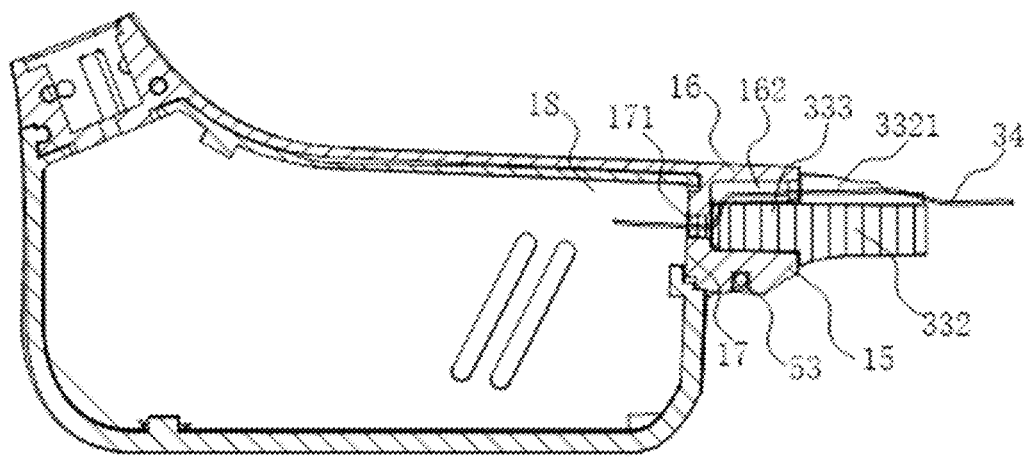
FIG. 4 is a schematic diagram illustrating a sectional view of a portion of a loudspeaker apparatus according to some embodiments of the present disclosure.

FIG. 1 is a schematic diagram illustrating an exemplary loudspeaker apparatus according to some embodiments of the present disclosure. FIG. 2 is a schematic diagram illustrating an exploded view of a portion of the loudspeaker apparatus illustrated in FIG. 1 according to some embodiments of the present disclosure. FIG. 3 is a schematic diagram illustrating an exploded view of a portion of the loudspeaker apparatus illustrated in FIG. 1 according to some embodiments of the present disclosure. FIG. 4 is a schematic diagram illustrating a sectional view of a portion of the loudspeaker apparatus illustrated in FIG. 1 according to some embodiments of the present disclosure. As shown in FIGS. 1-4, in some embodiments, the loudspeaker apparatus may be an apparatus, such as headphones, an MP3, or another apparatus with a speaker function. Specifically, the loudspeaker apparatus may include circuit housing(s) 10, ear hook(s) 50, a rear hook 30, speaker(s) 40, control circuit(s), one or more batteries, etc. A circuit housing 10 may be configured to accommodate a control circuit and/or a battery. A speaker 40 may include an earphone core housing 20. The earphone core housing 20 may be connected to an ear hook 50 and configured to accommodate an earphone core. In some embodiments, the count of the circuit housing(s) 10 and the count of the ear hook(s) 50 may be two, which may correspond to a left side and a right side of a user, respectively. For a certain ear hook 50, an earphone core housing 20 and a circuit housing 10 may be disposed at both sides of the certain ear hook 50, respectively. The rear hook 30 may be further disposed at a side of the circuit housing 10 away from the certain ear hook 50.

As shown in FIG. 2, a first protective housing 21 may be injection-molded on an ear hook 50. Specifically, the ear hook 50 may include a first elastic wire for supporting the shape of the ear hook 50. An ear hook protective sleeve 22 may be injection-molded outside a periphery of the first elastic wire. The ear hook protective sleeve 22 may further form a first protective housing 21 integrated with the ear hook protective sleeve 22 at a connected portion between the ear hook 50 and a circuit housing 10. That is, the first protective housing 21 may be placed on a side of the ear hook protective sleeve 22 facing the circuit housing 10.

Similarly, the rear hook 30 may be injection-molded with a second protective housing 31. Specifically, the rear hook 30 may also include a second elastic wire for supporting the shape of the rear hook 30, and a rear hook protective sleeve 32 injection-molded outside a periphery of the second elastic wire. The rear hook protective sleeve 32 may form a second protective housing 31 integrated with the rear hook protective sleeve 32 at a connected portion between the rear hook 30 and the circuit housing 10. That is, the second protective housing 31 may be placed on a side of the rear hook protective sleeve 32 facing the circuit housing 10.

In some embodiments, the first protective housing 21, the ear hook protective sleeve 22, the second protective housing 31, and the rear hook protective sleeve 32 may include a soft material with a certain elasticity, such as soft silicone, rubber, etc., so as to provide users with a better touch.

In some embodiments, the circuit housing 10, the first protective housing 21, and the second protective housing 31 may be molded separately. The shape of an inner side wall of the first protective housing 21 may match the shape of at least part of an outer side wall of the circuit housing 10 near the ear hook 50. The shape of an inner side wall of the second protective housing 31 may match the shape of at least part of an outer side wall of the circuit housing 10 near the rear hook 30. Furthermore, after the circuit housing 10, the first protective housing 21, and the second protective housing 31 are molded separately, the first protective housing 21 may be placed outside a periphery of the circuit housing 10 near the ear hook 50 from a side of the circuit housing 10 facing the ear hook 50, in a sleeve manner, and the second protective housing 31 may be placed outside a periphery of the circuit housing 10 near the rear hook 30 from a side of the circuit housing 10 facing the rear hook 30 in a sleeve manner, such that the circuit housing 10 may be covered by the first protective housing 21 and the second protective housing 31.

It should be noted that the high environment temperature during the molding of the first protective housing 21 and the second protective housing 31 may cause certain damages to the control circuit or the battery accommodated in the circuit housing 10. By molding the circuit housing 10, the first protective housing 21, and the second protective housing 31 separately, and then assembling them together instead of mounting the first protective housing 21 and the second protective housing 31 on the periphery of the circuit housing 10 directly by injection molding, the damage caused by the high temperature to the control circuit or the battery during the molding may be avoided, thereby reducing negative effects on the control circuit or the battery in the molding.

In some embodiments, the circuit housing 10 may include main side wall(s) 11, auxiliary side wall(s) 12, and end wall(s) 13 connected to each other. For example, the circuit housing 10 may be a flat housing. The flat circuit housing 10 may include two opposite main side wall 11 with relatively larger areas than other walls. When a user wears the loudspeaker apparatus, one of the two opposite main side walls 11 may attach (or approximately attach) to the head, and the other opposite main side wall may be away from the head. The auxiliary side wall(s) 12 and end wall(s) 13 may be used to connect the two main side walls 11. When the user wears the loudspeaker apparatus, the auxiliary side wall(s) 12 may include two side walls facing an upper side and a lower side of the user's head. The end wall(s) 13 may include a side wall of the circuit housing 10 near one end of the ear hook 50 and a side wall of the circuit housing 10 near one end of the rear hook 30, wherein these two side walls may be opposite to each other and face a front side and back side of the user's head, respectively, when the user wears the loudspeaker apparatus. The main side wall(s) 11, the auxiliary side wall(s) 12, and the end wall(s) 13 may be connected to each other to form the circuit housing 10.

In some embodiments, the first protective housing 21 may include an open end 211. The open end 211 may be sleeved on at least a portion of the circuit housing 10. For example, the open end 211 may cover the end wall(s) 13 on the side of the circuit housing 10 facing the ear hook 50, and optionally a portion of the main side wall(s) 11 and the auxiliary side wall(s) 12 near the ear hook 50. The second protective housing 31 may include an open end 311. The open end 311 may be sleeved on at least a portion of the circuit housing 10. For example, the open end 311 may cover the end wall 13(s) on one side of the circuit housing 10 facing the rear hook 30 and optionally a portion of the main side wall(s) 11 and the auxiliary side wall(s) 12 near the rear hook 30. In some embodiments, the open end 211 and the open end 311 may be coupled with each other on the main side wall(s) 11 and the auxiliary side wall(s) 12 of the circuit housing 10 so as to cover the entire circuit housing 10.

In an exemplary application scenario, the first protective housing 21 and the second protective housing 31 may not completely cover the entire circuit housing 10. For example, an exposure hole may be disposed at the circuit housing 10 for mounting a button and/or a charging interface to facilitate user operation.

After the first protective housing 21 and the second protective housing 31 are placed outside the periphery of the circuit housing 10, the two protective housings may be fixed on the circuit housing 10 by a certain means, thereby fixing the circuit housing 10 to the protective housings.

Specifically, in some embodiments, an inner surface of the first protective housing 21 corresponding to the main side wall(s) may include positioning convex(es) 215. An inner surface of the second protective housing 31 corresponding to the main side wall(s) 11 may include positioning convex(es) 315. An outer surface of the main side wall(s) 11 may be provided with positioning concave(s) 111 matching the positioning convex(es) 215 and a positioning concave(s) 112 matching the positioning convex(es) 315.

The positioning convex(es) 215 may be located on an inner side wall near the open end 211. For example, the positioning convex(es) 215 may include a ring-shaped convex surrounding the inner side wall of the first protective housing 21, or a plurality of convexes disposed at intervals on the inner side wall of the first protective housing 21, which may be determined according to actual needs. In some embodiments, a count of the positioning convex(es) 215 may be two. The two positioning convexes 215 may be located on the inner side walls of the first protective housing 21 corresponding to two side walls 11 of the circuit housing 10, respectively. Similarly, a count of the positioning convex(es) 315 may also be two. The two positioning convexes 315 may be located on the inner side walls of the second protective housing 31 corresponding to the two main side walls 11 of the circuit housing 10, respectively.

In some embodiments, after the first protective housing 21 and the second protective housing 31 are sleeved on both sides of the circuit housing 10, respectively, the positioning convex(es) 215 may be embedded into the positioning concave(s) 111, and the positioning convex(es) 315 may be embedded into the positioning concave(s) 112, such that the open end 211 of the first protective housing 21 and the open end 311 of the second protective housing 31 may be elastically abutted together, thereby covering the circuit housing 10.

Further, in some embodiments, an outer side wall 313 of a region of the second protective housing 31 that covers the end wall(s) 13 of the circuit housing 10 may be arranged obliquely with respect to the auxiliary side wall(s) 12. Specifically, when the user wears the loudspeaker apparatus, a direction from a side of the outer side wall 313 of the second protective housing 31 near the upper side of the user's head to a side near the lower side of the user's head may be oblique in a direction away from the rear hook 30.

In some embodiments, the positioning convex(es) 215 and the positioning convex(es) 315 may be in the form of strips along the open end 211 and the open end 311, respectively, and may be arranged obliquely with respect to the auxiliary side wall(s) 12. Further, a seam between the first protective housing 21 and the second protective housing 31 on the main side wall(s) 11 of the circuit housing 10 may also be arranged obliquely with respect to the auxiliary side wall(s) 12. The oblique directions the positioning convex(es) 215, the positioning convex(es) 315, and the seam between the first protective housing 21 and the protective housing 31 on the main side wall(s) 11 of the circuit housing 10 may be the same as an oblique direction of the outer side wall 313 of the region of the second protective housing 31 that covers the end wall(s) 13 of the circuit housing 10, thereby making the loudspeaker apparatus more consistent in appearance.

In an exemplary application scenario, a cover area of one of the first protective housing 21 and the second protective housing 31 on the circuit housing 10 may be not less than half of a cover area of the other one of the first protective housing 21 and the second protective housing 31 on the circuit housing 10. For example, the cover area of the first protective housing 21 on the circuit housing 10 may be not less than half of the cover area of the second protective housing 31 on the circuit housing 10. Alternatively, the cover area of the second protective housing 31 on the circuit housing 10 may be not less than half of the cover area of the first protective housing 21 on the circuit housing 10. It should be noted that the cover area of the first protective housing 21 on the circuit housing 10, the cover area of the second protective housing 31 on the circuit housing 10, and the ratio between the two cover areas may be modified according to needs. For example, the two cover areas may be the same, which is not specifically limited here.

In some embodiments, the circuit housing 10 and the rear hook 30 may be connected together by means of plugging, snapping, or the like.

In some embodiments, the rear hook 30 may further include a plug end 33 facing an end of the circuit housing 10 as shown in FIG. 3. The second protective housing 31 may be sleeved on at least part of the plug end 33. Specifically, the plug end 33 may be injection-molded at an end of the second elastic wire. The rear hook protective sleeve 32 may be further injection-molded outside the second elastic wire and part of the plug end 33, and a second protective housing 31 may be integrally molded at the plug end 33, such that the second protective housing 31 may be sleeved on a peripheral region of the plug end 33 that is not covered by the rear hook protective sleeve 32.

Further, the circuit housing 10 may include a jack 14 facing the rear hook 30. The jack 14 may be located on an end wall 13 of the circuit housing 10 near the rear hook 30, and extended from a side of the end wall 13 near an auxiliary side wall 12 to the rear hook 30.

The plug end 33 may be at least partially inserted into the jack 14. Two slots 331 perpendicular to an insertion direction of the plug end 33 relative to the jack 14 may be located on opposite sides of the plug end 33, respectively. The plug end 33 may include two slots 331 disposed on two opposite sides of the plug end 33. The two slot 331 may be perpendicular to an insertion direction of the plug end 33 relative to the jack 14, and spaced apart from each other by a distance and arranged on the opposite sides of the plug end 33 symmetrically. Further, the two slots 331 may be connected to a side wall corresponding to the plug end 33 in a direction perpendicular to the insertion direction of the plug end 33.

Accordingly, a first side wall 15 of the jack 14 may be provided with a first through hole 151 corresponding to the positions of the two slots 331. The first side wall 15 of the jack 14 may be placed outside the periphery of the jack 14 and face the lower side of the user's head when the loudspeaker is worn by the user.

In some embodiments, the loudspeaker apparatus may further include a fixing component 53. The fixing component 53 may include two pins 531 disposed in parallel and a connecting part 532 for connecting the pins 531. In some embodiments, the two pins 531 may be disposed in parallel, and the connecting part 532 may be vertically connected to a same side of the two pins 531, thereby forming a U-shaped fixing component 53.

The pins 531 may be inserted into the slots 331 through the through hole from an outer side wall of the first side wall 15 of the jack 14 so as to block the connecting part 532 outside the jack 14, thereby achieving a plug connection between the circuit housing 10 and the rear hook 30.

In some embodiments, a second through hole 161 opposite to the first through hole 151 may be disposed on a second side wall 16 opposite to the first side wall 15 on the jack 14. The pins 531 may be further inserted into the second through hole 161 through the slots 331. The second side wall 16 may be an auxiliary side wall 12 of the circuit housing 10 near the jack 14, and when the loudspeaker apparatus is worn by the user, the auxiliary side wall 12 may face the upper side of the user's head.

In some embodiments, the pins 531 may be inserted into the slots 331 through the first through hole 151 and further inserted into the second through hole 161 through the slots 331. In other words, the pins 531 may completely penetrate and establish a connection between the plug end 33 and the two opposite side walls of the plug end 33, thereby achieving a more stable plug connection between the circuit housing 10 and the rear hook 30.

In some embodiments, the plug end 33 may be divided into a first plug section 332 and a second plug section 333 along an insertion direction of the plug end 33 relative to the jack 14. A cross-section area of the first plug section 332 may be larger than that of the second plug section 333 in a sectional direction perpendicular to the insertion direction of the plug end 33 relative to the jack 14.

The rear hook protective sleeve 32 may be injection-molded on the first plug section 332 of the plug end 33, and the second protective housing 31 may be integrally injection-molded at a connected portion between the first plug section 332 and the second plug section 333. Further, the slots 331 may be located on the second plug section 333, and the second plug section 333 may be inserted into the jack 14. The plug end 33 may be exposed outside the jack 14.

In some embodiments, the first plug section 332 may include a first wiring duct 3321 extending along an insertion direction of the plug end 33 relative to the jack 14. The second plug section 333 may include a second wiring duct 3331 located on an outer end surface of the second plug section 333 that is far from the first plug section 332. The second wiring duct 3331 may extend along a direction perpendicular to the insertion direction of the plug end 33 and penetrate at least one outer side. Specifically, the first wiring duct 3321 may be located on a side of the first plug section 332 near the auxiliary side wall(s) 12 of the jack 14, and penetrate both end surfaces of the first plug section 332 along the insertion direction of the plug end 33 relative to the jack 14. The second wiring duct 3331 may penetrate two outer sides of the second plug section 333 perpendicular to an extending direction of the second wiring duct 3331.

In addition, an inner side wall of the jack 14 may include a third wiring duct 162 with one end connected to the first wiring duct 3321 and the other end connected to the second wiring duct 3331. The third wiring duct 162 may be formed by recessing an inner wall surface of the second side wall 16.

In some embodiments, the circuit housing 10 may include an inner partition wall 17 inside the housing to form an accommodating cavity 18 spaced apart from the jack 14. Specifically, the main side wall(s) 11, the auxiliary side wall(s) 12, and the end wall(s) 13 of the circuit housing 10 may form an accommodating space. The inner partition wall 17 may divide the accommodating space into two parts including the accommodating cavity 18 and the jack 14. The inner partition wall 17 may further include a wiring hole 171 connecting the jack 14 and the accommodating cavity 18.

In some embodiments, the loudspeaker apparatus may further include a rear hook wire 34. The rear hook wire 34 may pass through the rear hook 30. Two ends of the rear hook wire 34 may be connected to the control circuit and the battery, respectively. Specifically, the rear hook wire 34 may pass through the rear hook 30, the first wiring duct 3321, the third wiring duct 162, and the second wiring duct 3331 successively, and then pass through the wiring hole 171 and enter the accommodating cavity 18, so as to connect to the control circuit or the battery.

It should be noted that the above description of the earphone core housing of the loudspeaker apparatus is only a specific example, and should not be regarded as the only feasible implementation solution. Obviously, for those skilled in the art, after understanding the basic principle of earing of an earphone core of the loudspeaker apparatus, it is possible to make various modifications and alterations in the form and details of the structure and/or related methods of the earphone core housing (or a portion thereof) without departing from this principle, but these amendments and alterations are still within the scope described above. For example, the circuit housing may be integrated with the rear hook. All such variations are within the protection scope of the present disclosure.

In some embodiments, the loudspeaker apparatus may further include a speaker mechanism, such as a bone conduction speaker mechanism, an air conduction speaker mechanism, or the like. As used herein, a bone conduction refers to a sound conduction manner in which sound may be converted into mechanical vibrations of different frequencies, and sound waves may be transmitted through the human skull, bone labyrinth, inner ear lymphatic fluid transmission, spiral organs, auditory nerve, auditory center, etc. In some embodiments, the speaker mechanism may include an MP3 player, a hearing aid, or the like.

In some embodiments, the speaker mechanism of the loudspeaker apparatus may be a separate player that can be used directly, or may be a player that is plugged into an electronic device for use.

It should be noted that, without departing from the principles, the content described below may be equally applied to the air conduction loudspeaker apparatus and the bone conduction loudspeaker apparatus.

Figure 5:
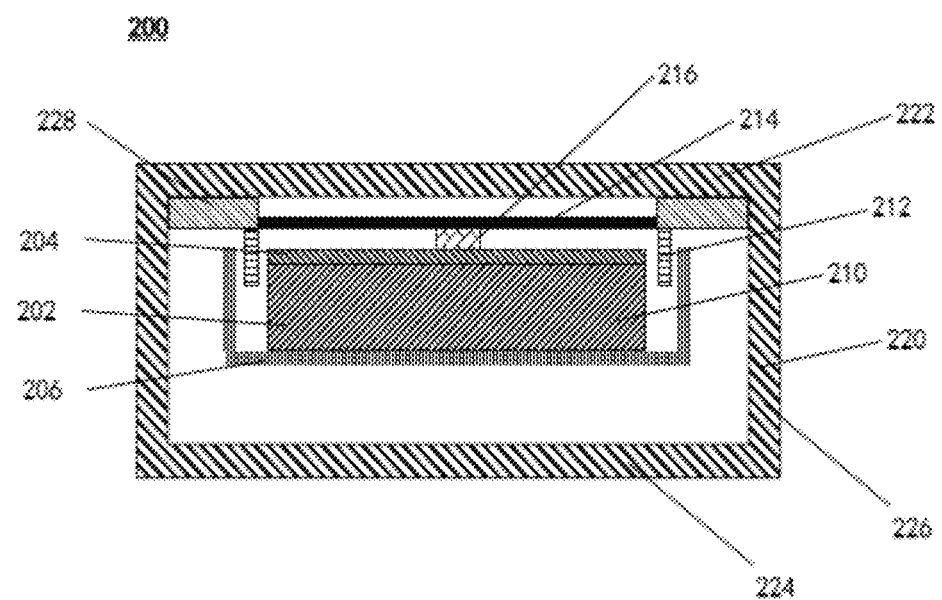
FIG. 5 is a schematic diagram illustrating a longitudinal sectional view of a loudspeaker apparatus according to some embodiments of the present disclosure.

FIG. 5 is a schematic diagram illustrating a longitudinal sectional view of a loudspeaker apparatus according to some embodiments of the present disclosure. As shown in FIG. 5, in some embodiments, the loudspeaker apparatus may include a magnetic circuit assembly 210, a coil 212, a vibration transmission plate 214, a connection member 216, and a housing 220. Further, in some embodiments, the magnetic circuit assembly 210 may include a first magnetic element 202, a first magnetic guide element 204, and a second magnetic guide element 206. In some embodiments, the earphone core housing 20 has a structure similar to or the same as the housing 220.

In some embodiments, the housing 220 may include a housing panel 222 facing the human body, a housing back 224 opposite to the housing panel and a housing side 226. The housing back 224 may be located on a side opposite to the housing panel 222, and respectively disposed on two ends of the housing side 226. The housing panel 222, the housing back 224, and the housing side 226 may form an integral structure with a certain accommodation space. In some embodiments, the magnetic circuit assembly 210, the coil 212, and the transmission vibration plate 214 may be fixed inside the housing 220. In some embodiments, the loudspeaker apparatus may further include a housing bracket 228. The vibration transmission plate 214 may be connected to the housing 220 through the housing bracket 228. The coil 212 may be fixed on the housing bracket 228. The housing 220 may be driven to vibrate by the housing bracket 228. In some embodiments, the housing bracket 228 may be a part of the housing 220. Alternatively, the housing bracket 228 may be a separate component, directly or indirectly connected to the inside of the housing 220. In some embodiments, the housing bracket 228 may be fixed on an inner surface of the housing side 226. In some embodiments, the housing bracket 228 may be pasted on the housing 220 by glue, or be fixed on the housing 220 by stamping, injection molding, clamping, riveting, screw connection, or welding.

In some embodiments, it may be possible to design a connection manner between the housing panel 222, the housing back 224, and the housing side 226 to ensure that the housing 220 has a greater rigidity. In some embodiments, the housing panel 222, the housing back 224, and the housing side 226 may be integrally formed. In some embodiments, the housing back 224 and the housing side 226 may be an integral structure. The housing panel 222 and the housing side 226 may be directly pasted and fixed by glue, or fixed by means of clamping, welding, or screw connection. The glue may be glue with strong viscosity and high hardness. In some embodiments, the housing panel 222 and the housing side 226 may be an integral structure, and the housing back 224 and the housing side 226 may be directly pasted and fixed by glue, or fixed by the clamping, welding, or screw connection. In some embodiments, the housing panel 222, the housing back 224, and the housing side 226 may be all independent components, and the three components may be connected and fixed by one or a combination of the glue, clamping, welding, or screw connection. For example, the housing panel 222 and the housing side 226 may be connected by glue, and the housing back 224 and the housing side 226 may be connected by the clamping, welding, or screw connection. Alternatively, the housing back 224 and the housing side 226 may be connected by glue, and the housing panel 222 and the housing side 226 may be connected by the clamping, welding, or screw connection.

In different application scenarios, the housing of the loudspeaker apparatus described in the present disclosure may be made by different assembly manners. For example, as described elsewhere in the present disclosure, the housing of the loudspeaker apparatus may be integrally formed, split assembled, or a combination of the two manners. In the split assembling, different splits may be pasted and fixed by glue, or fixed by the clamping, welding or screw connection. Specifically, in order to better understand the assembly manner of the housing of the loudspeaker apparatus in the present disclosure, FIGS. 6-8 may describe several examples of the assembly manner of the housing of the loudspeaker apparatus.

Figure 6:
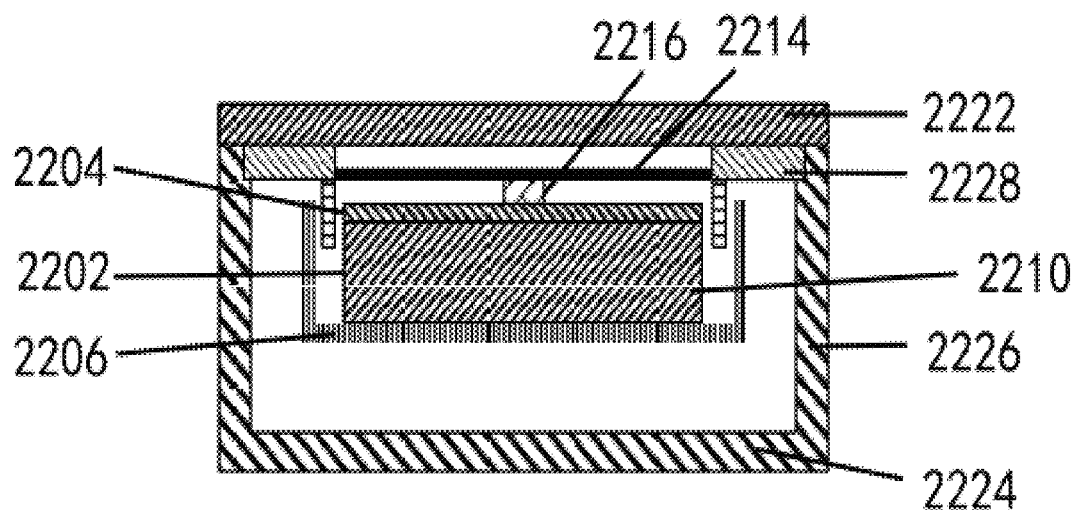
FIG. 6 is a schematic diagram illustrating another longitudinal sectional view of a loudspeaker apparatus according to some embodiments of the present disclosure.

As shown in FIG. 6, the loudspeaker apparatus may mainly include a magnetic circuit assembly 2210 and a housing (numbered as 220 in FIG. 5). In some embodiments, the magnetic circuit assembly 2210 may include a first magnetic element 2202, a first magnetic guide element 2204, and a second magnetic guide element 2206.

In some embodiments, the magnetic circuit assemblies in the above embodiments may have a same structure, which may refer to structures that provide magnetic fields, and the housings in the above embodiments may also have the same structure, which may refer to structures that accommodate the magnetic circuit assemblies.

In some embodiments, the housing of the loudspeaker apparatus may include a housing panel 2222, a housing back 2224, and a housing side 2226. The housing side surface 2226 and the housing back 2224 may be made in an integral manner, and the housing panel 2222 may be connected to one end of the housing side 2226 through the split assembling. The split assembling may include fixing the housing panel 2222 to one end of the housing side 2226 by using glue, or by means of clamping, welding or screw connection. The housing panel 2222 and the housing side 2226 (or the housing back 2224) may be made of different materials, a same material, or partly same materials. In some embodiments, the housing panel 2222 and the housing side 2226 may be made of the same material, and a Young's modulus of the same material may be greater than 2000 MPa. More preferably, the Young's modulus of the same material may be greater than 4000 MPa. More preferably, the Young's modulus of the same material may be greater than 6000 MPa. More preferably, the Young's modulus of the housing 220 material may be greater than 8000 MPa. More preferably, the Young's modulus of the same material may be greater than 12000 MPa. More preferably, the Young's modulus of the same material may be greater than 15000 MPa. Further preferably, the Young's modulus of the same material may be greater than 18000 MPa. In some embodiments, the housing panel 2222 and the housing side 2226 may be made of different materials, and Young's moduli of the different materials may be greater than 4000 MPa. More preferably, the Young's moduli of the different materials may be all greater than 6000 MPa. More preferably, the Young's moduli of the different materials may be greater than 8000 MPa. More preferably, the Young's moduli of the different materials are all greater than 12000 MPa. More preferably, the Young's moduli of the different materials may be greater than 15000 MPa. Further preferably, the Young's moduli of the different materials may be greater than 18000 MPa. In some embodiments, the material of the housing panel 2222 and/or the housing side 2226 may include but not be limited to acrylonitrile butadiene styrene (ABS), polystyrene (PS), high impact polystyrene (HIPS), polypropylene (PP), polyethylene terephthalate (PET), polyester (PES), polycarbonate (PC), Polyamides (PA), polYvinYl chloride (PVC), polyurethanes (PU), polyvinylidene chloride, polyethylene (PE), polymethyl methacrylate (PMMA), polyetheretherketone (PEEK), phenolics (PF), urea-formaldehyde (UF), melamine formaldehyde (MF), some metals, alloy (e.g., aluminum alloy, chromium-molybdenum steel, scandium alloy, magnesium alloy, titanium alloy, magnesium-lithium alloy, nickel alloy, etc.), glass fiber, carbon fiber, or any combination of thereof. In some embodiments, the material of the housing panel 2222 may be any combination of glass fiber, carbon fiber, polycarbonate (PC), Polyamides (PA), and other materials. In some embodiments, the material of the housing panel 2222 and/or the housing side 2226 may be made by mixing carbon fiber and polycarbonate (PC) in a certain ratio. In some embodiments, the material of the housing panel 2222 and/or the housing side 2226 may be made by mixing carbon fiber, glass fiber, and polycarbonate (polycarbonate, PC) in a certain proportion. In some embodiments, the material of the housing panel 2222 and/or the housing side 2226 may be made by mixing glass fiber and polycarbonate (PC) in a certain proportion, or made of glass fiber and polyamides (PA) in a certain proportion.

As shown in FIG. 6, the housing panel 2222, the housing back 2224, and the housing side 2226 may form an integral structure with a certain accommodation space. In some embodiments, in the integral structure, the vibration transmission plate 2214 may be connected to the magnetic circuit assembly 2210 through the connection member 2216. Two sides of the magnetic circuit assembly 2210 may be respectively connected to the first magnetic guide element 2204 and the second magnetic guide element 2206. The vibration transmission plate 2214 may be fixed inside the overall structure through the housing bracket 2228. In some embodiments, the housing side 2226 may have a step structure for supporting the housing bracket 2228. After the housing support 2228 is fixed to the housing side 2226, the housing panel 2222 may be fixed on the housing support 2228 and the housing side 2226 at the same time, or separately fixed on the housing support 2228 or the housing side 2226. In this case, optionally, the housing side 2226 and the housing bracket 2228 may be integrally formed. In some embodiments, the housing bracket 2228 may be directly fixed on the housing panel 2222 (e.g., by means of glue, clamping, welding, or screw connection). The fixed housing panel 2222 and housing bracket 2228 may be then fixed to the housing side (e.g., by means of glue, clamping, welding, or screw connection). In this case, optionally, the housing bracket 2228 and the housing panel 2222 may be integrally formed.

Figure 7:
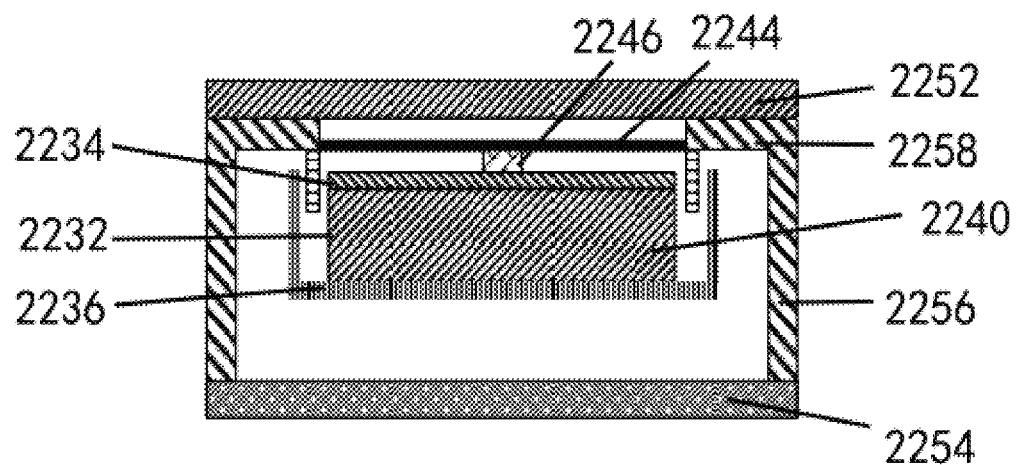
FIG. 7 is a schematic diagram illustrating another longitudinal sectional view of a loudspeaker apparatus according to some embodiments of the present disclosure.

As shown in FIG. 7, the loudspeaker apparatus in this embodiment may mainly include a magnetic circuit assembly 2240 and a housing. As used herein, the magnetic circuit assembly 2240 may include a first magnetic element 2232, a first magnetic guide element 2234, and a second magnetic guide element 2236. In the integral structure, a vibration transmission plate 2244 may be connected to the magnetic circuit assembly 2240 through a connection member 2246.

In some embodiments, the magnetic circuit assemblies in the above embodiments may have a same structure, which may refer to structures that provide magnetic fields. The housings in the above embodiments may also have the same structure, which may refer to structures that accommodate the magnetic circuit assemblies. The vibration transmission plates in the above-mentioned embodiments may also have the same structure, which may refer to structures that adjust low-frequency resonance peaks. Similarly, the connection members in the above embodiments may refer to elements that connect the vibration transmission plates and the magnetic circuit assemblies. This embodiment is different from the embodiment provided in FIG. 6 in that the housing bracket 2258 and a housing side surface 2256 may be integrally formed. A housing panel 2252 may be fixed on the side of the housing side surface 2256 connected to a housing bracket 2258 (for example, by glue, clip, welding or screw connection), and a housing back 2254 may be fixed on the other side of the housing side surface 2256 (for example, pasting by glue, clamping, welding or screw connection, etc.). In this case, in some embodiments, the housing bracket 2258 and the housing side surface 2256 may be a split combination structure, and the housing panel 2252, the housing back 2254, the housing bracket 2258 and the housing side surface 2256 may be fixed by pasting by glue, clamping, welding or screw connection.

Figure 8:
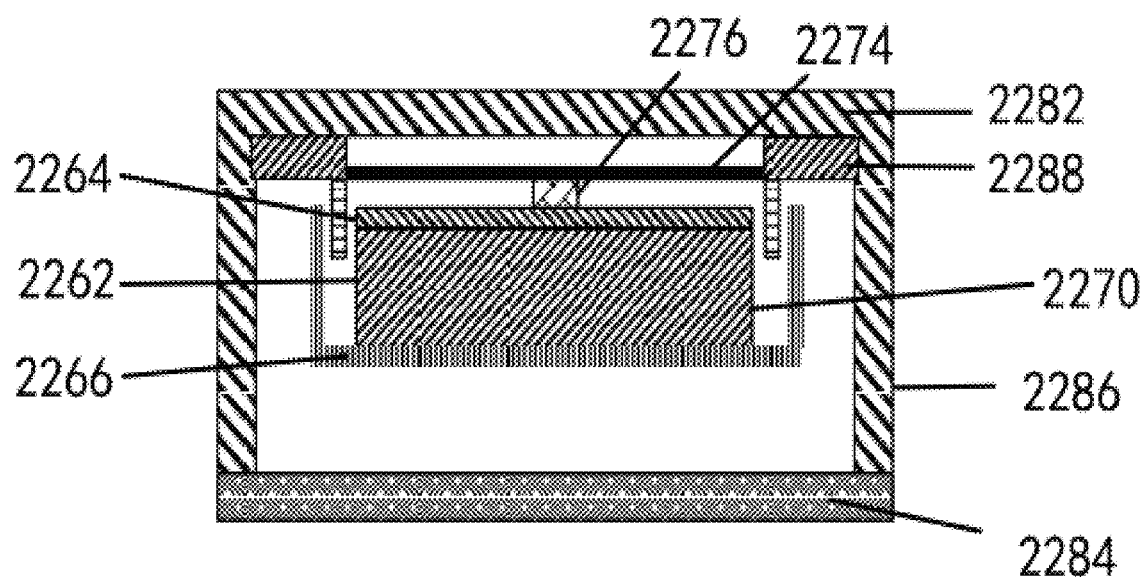
FIG. 8 is a schematic diagram illustrating another longitudinal sectional view of a loudspeaker apparatus according to some embodiments of the present disclosure.

As shown in FIG. 8, the loudspeaker apparatus in this embodiment may mainly include a magnetic circuit assembly 2270 and a housing. As used herein, the magnetic circuit assembly 2270 may include a first magnetic element 2262, a first magnetic guide element 2264, and a second magnetic guide element 2266. In the integral structure, a vibration plate 2274 may be connected to the magnetic circuit assembly 2270 through a connector 2276.

In some embodiments, the magnetic circuit assemblies in the above embodiments may have a same structure, which may refer to structures that provide magnetic fields. The housings in the above embodiments may also have the same structure, which may refer to structures that accommodate the magnetic circuit assembly. The vibration transmission plates in the above-mentioned embodiments may also have the same structure, which may refer to structures that adjust low-frequency resonance peaks.

The difference from FIG. 6 and FIG. 7 may be that the housing panel 2282 and the housing side surface 2286 are integrally formed. The housing back 2284 may be fixed on the housing side 2286 opposite to one side of the housing panel 2282 (e.g., by means of glue, clamping, welding or screw connection). The housing bracket 2288 may be fixed on the housing panel 2282 and/or the housing side 2286 by means of glue, clamping, welding or screw connection. In this case, optionally, the housing bracket 2288, the housing panel 2282, and the housing side 2286 may be integrally formed.

Figure 9:
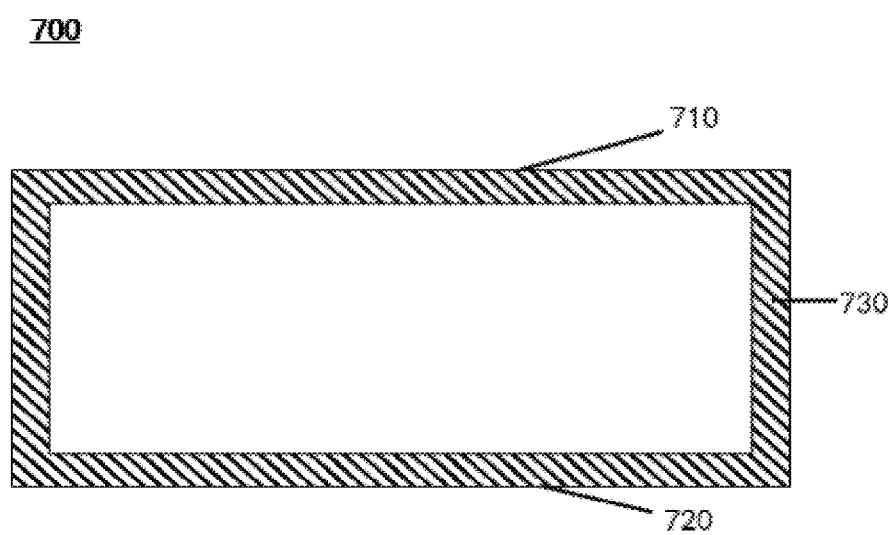
FIG. 9 is a schematic diagram illustrating a longitudinal sectional view of a housing according to some embodiments of the present disclosure.

FIG. 9 is a schematic diagram illustrating a longitudinal sectional view of a housing according to some embodiments of the present disclosure. As shown in FIG. 9, the housing 700 may include a housing panel 710 facing the human body, a housing back 720 opposite to the housing panel 710 and a housing side surface 730. The housing panel 710 may be in contact with the human body, and may transmit a vibration of the loudspeaker apparatus to the auditory nerve of the human body.

In some embodiments, the earphone core may result in vibrations of the housing panel 710 and the housing back 720, the vibration of the housing panel 710 may have a first phase, and the vibration of the housing back 720 may have a second phase. In some embodiments, when vibration frequencies of the housing panel 710 and the housing back 720 are in a range of 2000 Hz to 3000 Hz, an absolute value of a difference between the first phase and the second phase may be less than 60 degrees.

In some embodiments, when an overall rigidity of the housing 700 is relatively large, vibration amplitudes and phases of the housing panel 710 and the housing back 720 may remain the same or substantially same (the housing side 730 does not compress air and therefore does not generate sound leakage) within a certain frequency range, so that a first sound leakage wave generated by the housing panel 710 and a second sound leakage wave generated by the housing back 720 may be superimposed on each other. The superposition may reduce the amplitude of a first leakage sound wave or a second leakage sound wave, thereby achieving a purpose of reducing the sound leakage of the housing 700. In some embodiments, the certain frequency range may include at least a part of frequencies greater than 500 Hz. Preferably, the certain frequency range may include at least a part of frequencies greater than 600 Hz. Preferably, the certain frequency range may include at least a part of frequencies greater than 800 Hz. Preferably, the certain frequency range may include at least a part of frequencies greater than 1000 Hz. Preferably, the certain frequency range may include at least a part of frequencies greater than 2000 Hz. More preferably, the certain frequency range may include at least a part of frequencies greater than 5000 Hz. More preferably, the certain frequency range may include at least a part of frequencies greater than 8000 Hz. Further preferably, the certain frequency range may include at least a part of frequencies greater than 10000 Hz.

In some embodiments, the rigidity of the housing of the loudspeaker apparatus may affect the vibration amplitudes and phases of different parts of the housing (e.g., the housing panel, the housing back, and/or the housing side), thereby affecting the sound leakage of the loudspeaker apparatus. In some embodiments, when the housing of the loudspeaker apparatus has a relatively large rigidity, the housing panel and the housing back may maintain a same or substantially same vibration amplitude and phase at a relatively high frequency, thereby significantly reducing the sound leakage of the loudspeaker apparatus.

In some embodiments, the relatively high frequency may include a frequency larger than or equal to 1000 Hz, for example, a frequency between 1000 Hz and 2000 Hz, a frequency between 1100 Hz and 2000 Hz, a frequency between 1300 Hz and 2000 Hz, a frequency between 1500 Hz and 2000 Hz, a frequency between 1700 Hz and 2000 Hz, and a frequency between 1900 Hz and 2000 Hz. Preferably, the relatively high frequency mentioned herein may include a frequency larger than or equal to 2000 Hz, for example, a frequency between 2000 Hz and 3000 Hz, a frequency between 2100 Hz and 3000 Hz, a frequency between 2300 Hz and 3000 Hz, a frequency between 2500 Hz and 3000 Hz, a frequency between 2700 Hz and 3000 Hz, or a frequency between 2900 Hz and 3000 Hz. Preferably, the relatively high frequency may include a frequency larger than or equal to 4000 Hz, for example, a frequency between 4000 Hz and 5000 Hz, a frequency between 4100 Hz and 5000 Hz, a frequency between 4300 Hz and 5000 Hz, a frequency between 4500 Hz and 5000 Hz, a frequency between 4700 Hz and 5000 Hz, or a frequency between 4900 Hz and 5000 Hz. More preferably, the relatively high frequency may include a frequency larger than or equal to 6000 Hz, for example, a frequency between 6000 Hz and 8000 Hz, a frequency between 6100 Hz and 8000 Hz, a frequency between 6300 Hz and 8000 Hz, a frequency between 6500 Hz and 8000 Hz, a frequency between 7000 Hz and 8000 Hz, a frequency between 7500 Hz and 8000 Hz, or a frequency between 7900 Hz and 8000 Hz. Further preferably, the relatively high frequency may include a frequency larger than or equal to 8000 Hz, for example, a frequency between 8000 Hz and 12000 Hz, a frequency between 8100 Hz and 12000 Hz, a frequency between 8300 Hz and 12000 Hz, a frequency between 8500 Hz and 12000 Hz, a frequency between 9000 Hz and 12000 Hz, a frequency between 10000 Hz and 12000 Hz, or a frequency between 11000 Hz and 12000 Hz.

Maintaining the same or substantially same vibration amplitude of the housing panel and the housing back means that a ratio of the vibration amplitudes of the housing panel and the housing back is within a certain range. For example, the ratio of the vibration amplitude of the housing panel to the vibration amplitude of the housing back may be between 0.3 and 3. Preferably, the ratio may be between 0.4 and 2.5. Preferably, the ratio may be between 0.5 and 1.5. More preferably, the ratio may be between 0.6 and 1.4. More preferably, the ratio may be between 0.7 and 1.2. More preferably, the ratio may be between 0.75 and 1.15. More preferably, the ratio may be between 0.8 and 1.1. More preferably, the ratio may be between 0.8 and 1.1. More preferably, the ratio may be between 0.85 and 1.1. Further preferably, the ratio may be between 0.9 and 1.05. In some embodiments, the vibrations of the housing panel and the housing back may be represented by other physical quantities that can characterize the vibration amplitude. For example, sound pressures generated by the housing panel and the housing back at a point in the space may be used to represent the vibration amplitudes of the housing panel and the housing back.

Maintaining the same or substantially same vibration phase of the housing panel and the housing back means that a difference between the vibration phases of the housing panel and the housing back may be within a certain range. For example, the difference between the vibration phase of the housing panel and the vibration phase of the housing back may be between −90 degrees and 90 degrees. Preferably, the difference may be between −80 degrees and 80 degrees. Preferably, the difference may be between −60 degrees and 60 degrees. Preferably, the difference may be between −45 degrees and 45 degrees. More preferably, the difference may be between −30 degrees and 30 degrees. More preferably, the difference may be between −20 degrees and 20 degrees. More preferably, the difference may be between −15 degrees and 15 degrees. More preferably, the difference may be between −12 degrees and 12 degrees. More preferably, the difference may be between −10 degrees and 10 degrees. More preferably, the difference may be between −8 degrees and 8 degrees. More preferably, the difference may be between −6 degrees and 6 degrees. More preferably, the difference may be between −5 degrees and 5 degrees. More preferably, the difference may be between −4 degrees and 4 degrees. More preferably, the difference may be between −3 degrees and 3 degrees. More preferably, the difference may be between −2 degrees and 2 degrees. More preferably, the difference may be between −1 degrees and 1 degrees. Further preferably, the difference may be 0 degree.

It should be noted that the above description of the loudspeaker apparatus is only a specific example, and should not be regarded as the only feasible implementation solution. Obviously, for those skilled in the art, after understanding the basic principle of the of the loudspeaker apparatus, it may be possible to make various modifications and variations in the form and details of the specific method and operation of implementing the earphone core housing of the implemented loudspeaker apparatus without departing from these principles, but these modifications and variations are still within the scope described above. For example, the connection between the housing side, the housing back and the panel may not be limited to the above-mentioned connection. For example, the housing side, the housing back, and the housing bracket may be an integral structure. Such variations are all within the protection scope of the present disclosure.

Figure 10:
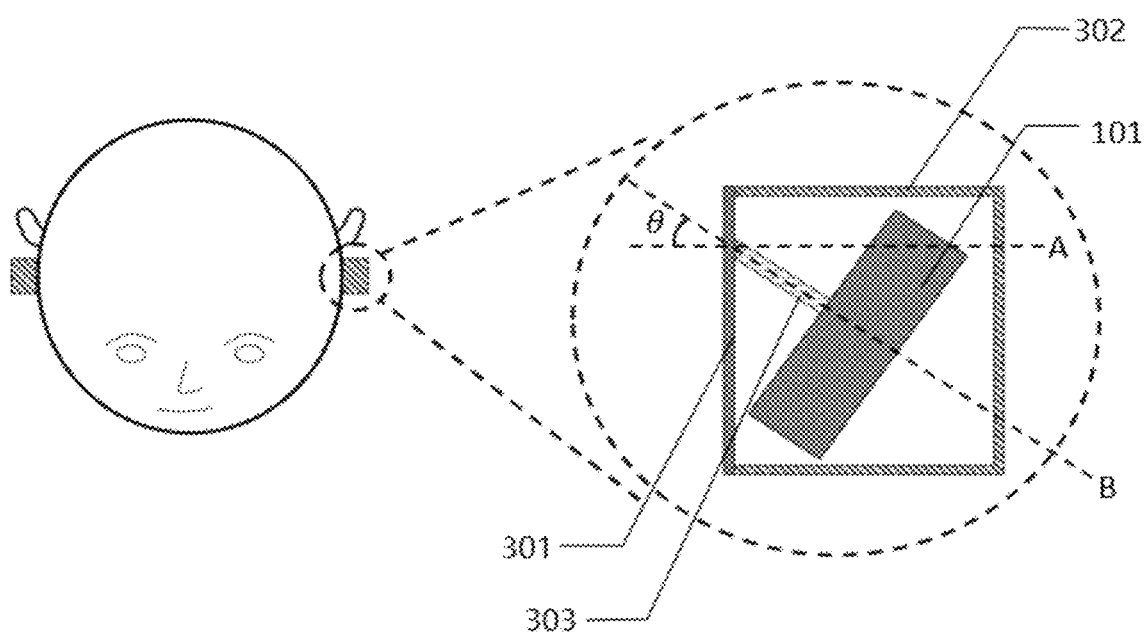
FIG. 10 is a schematic diagram illustrating an application scenario and structure of a loudspeaker apparatus according to some embodiments of the present disclosure.

FIG. 10 is a schematic diagram illustrating an application scenario and structure of a loudspeaker apparatus according to some embodiments of the present disclosure. As shown in FIG. 10, in some embodiments, the loudspeaker apparatus may include a driving device 101, a transmission assembly 303, a panel 301, and a housing 302.

It should be noted that the housings in the above embodiments may have same structure, which may refer to structures that accommodate the magnetic circuit assemblies. The panel and the housing panel may have a same structure, which may refer to structures that transmit sound by touching the human body.

In some embodiments, the driving device 101 may transmit vibration signals to the panel 301 and/or the housing 302 through the transmission assembly 303, so as to contact with human skin through the panel 301 or the housing 302, thereby transmitting sound to the human body. In some embodiments, the panel 301 and/or the housing 302 of the loudspeaker apparatus may be in contact with the human skin at a tragus, so as to transmit sound to the human body. In some embodiments, the panel 301 and/or the housing 302 may also be in contact with human skin on a back side of an auricle.

As shown in FIG. 10, according to the loudspeaker apparatus provided in some embodiments of the present disclosure, a straight line B (or a vibration direction of a driving device) where a driving force generated by the driving device 101 is along may have an included angle θ with a normal line A of the panel 301. In other words, the straight line B and the straight line A may not be parallel.

Further, the panel 301 has a region in contact with or abutting on the user's body (e.g., human skin). It should be understood that when the panel 301 is covered with other materials (e.g., soft materials such as silicone, etc.) to enhance wearing comfort of the user, a relationship between the panel 301 and the user's body may not direct contact, but be abutting on each other. In some embodiments, after the loudspeaker apparatus is worn on the user's body, all regions of the panel 301 may be in contact with or abutting on the user's body. In some embodiments, after the loudspeaker apparatus is worn on the user's body, part region of the panel 301 may be in contact with or abutting on the user's body. In some embodiments, the region of the panel used to contact with or abut on the user's body may occupy more than 50% of an area of the entire panel 301. More preferably, the region may occupy more than 60% of the area of the entire panel 301. Generally speaking, the region of the panel 301 that is in contact with or abutting on the user's body may be a flat surface or a curved surface.

In some embodiments, when the region of the panel 301 used to contact with or abut on the user's body is a plane, the normal line may satisfy a general definition of a normal line. In some embodiments, when the region of the panel 301 used to contact with or abut on the user's body is a curved surface, the normal line may be an average normal line of the region.

As used herein, the average normal may be defined as:

$$\hat{r_0} = \frac{\oiint_S \hat{r}\, ds}{|\oiint_S \hat{r}\, ds|} \quad (1)$$

$\hat{r_0}$ is the average normal line; $\hat{r}$ is a normal line of any point on the surface, and $ds$ is a surface element.

Further, the curved surface may be a quasi-plane close to a plane, that is, a surface where an included angle between the normal of any point in at least 50% of the region of the curved surface and the average normal line is less than a set threshold. In some embodiments, the set threshold may be less than 10 degrees. In some embodiments, the set threshold may be further less than 5 degrees.

The straight line B where the driving force is along and a normal line A' of the region on the panel 301 used to contact with or abut on the user's body may have the included angle θ. The included angle θ may be in a range of 0 to 180 degrees. Further, the included angle θ may be in a range of 0 to 180 degrees and not equal to 90 degrees. In some embodiments, the straight line B may be set to be in a positive direction pointing out of the loudspeaker apparatus, the normal line A of the panel 103 (or the normal line A' of a contact surface between the panel 301 and the human skin) may be set to be in a positive direction pointing out of the loudspeaker apparatus, an included angle θ between the normal line A or A' and the straight line B in the positive direction may be an acute angle, that is, in a range of 0 to 90 degrees.

Figure 11:
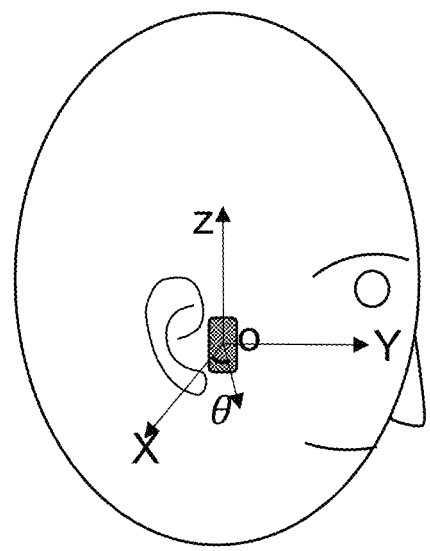
FIG. 11 is a schematic diagram illustrating an angle direction according to some embodiments of the present disclosure.

FIG. 11 is a schematic diagram illustrating an angle direction according to some embodiments of the present disclosure. As shown in FIG. 11, in some embodiments, a driving force generated by the driving device 101 may have components in a first quadrant and/or a third quadrant of a plane coordinate system XOY. As used herein, the plane coordinate system XOY is a reference coordinate system, and the origin O of the plane coordinate system XOY is located on a contact surface between a panel and/or a housing and a human body after a loudspeaker apparatus is worn on a human body. The X-axis may be parallel to a coronal axis of the human body and the Y-axis may be parallel to a sagittal axis of the human body. A positive direction of the X-axis may face toward the outside of the human body, and a positive direction of the Y-axis may face toward the front of the human body. The quadrant should be understood as four regions divided by a horizontal axis (e.g., the X-axis) and a vertical axis (e.g., the Y-axis) in a plane rectangular coordinate system, and each region is called a quadrant. The quadrants are centered at the origin, and the X-axis and Y-axes are the dividing lines. The upper right region (a region enclosed by a positive half axis of the X-axis and a positive half axis of the Y-axis) is called the first quadrant, the upper left region (a region enclosed by a negative half axis of the X-axis and the positive half axis of the Y-axis) is called a second quadrant, the lower left region (a region enclosed by the negative half axis of the X-axis and a negative half axis of the Y-axis) is called the third quadrant, and the lower right region (a region enclosed by the positive half axis of the X-axis and the negative half axis of the Y-axis) is called a fourth quadrant. As used herein, a point on the coordinate axis may not belong to any quadrant. It should be understood that the driving force in this embodiment may be directly located in the first quadrant and/or third quadrant of the plane coordinate system XOY. Alternatively, the driving force may be directed in other directions, but a projection or component in the first quadrant and/or the third quadrant of the plane coordinate system XOY is not zero, and the projection or component in a Z-axis direction may be zero or not be zero. As used herein, the Z-axis is perpendicular to the plane XOY and passes through the origin O. In some specific embodiments, a minimum included angle $\theta$ between the straight line where the driving force is along and the normal line of the region on the panel that is in contact with or abutting on the user's body may be any acute angle. For example, preferably, the included angle $\theta$ may be in a range of 5-80 degrees. More preferably, the included angle $\theta$ may be in a range of 15-70 degrees. More preferably, the included angle $\theta$ may be in a range of 25-60 degrees. More preferably, the included angle $\theta$ may be in a range of 25-50 degrees. More preferably, the included angle $\theta$ may be in a range of 28-50 degrees. More preferably, the included angle $\theta$ may be in a range of 30-39 degrees. More preferably, the included angle $\theta$ may be in a range of 31-38 degrees. Further preferably, the included angle $\theta$ may be in a range of 32-37 degrees. Further preferably, the included angle $\theta$ may be in a range of 33-36 degrees. Further preferably, the included angle $\theta$ may be in a range of 33-35.8 degrees. Further preferably, the included angle $\theta$ may be in a range of 33.5-35 degrees. Specifically, the included angle $\theta$ may be 26 degrees, 27 degrees, 28 degrees, 29 degrees, 30 degrees, 31 degrees, 32 degrees, 33 degrees, 34 degrees, 34.2 degrees, 35 degrees, 35.8 degrees, 36 degrees, 37 degrees, 38 degrees, etc., and an error may be controlled within 0.2 degree. It should be noted that the above description of the direction of the driving force should not be interpreted as a limitation of the driving force in the present disclosure. In other embodiments, the driving force may also have components in the second and fourth quadrants of the plane coordinate system XOY. Even the driving force may be along the Y-axis, etc.

Figure 12:
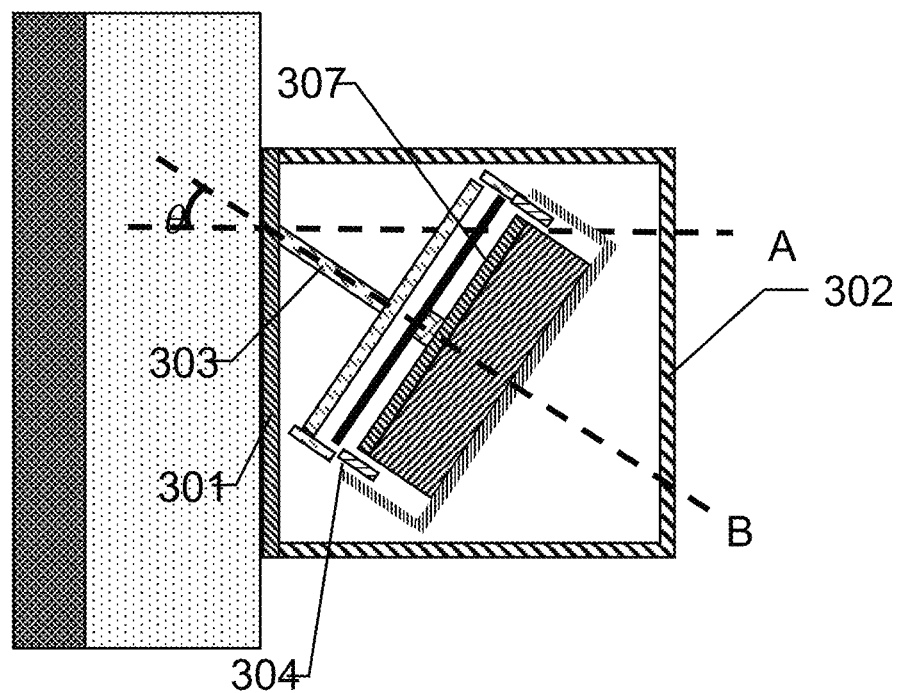
FIG. 12 is a structural schematic diagram illustrating a loudspeaker apparatus acting on human skin and bones according to some embodiments of the present disclosure.

FIG. 12 is a structural schematic diagram illustrating a loudspeaker apparatus acting on human skin and bones according to some embodiments of the present disclosure. As shown in FIG. 12, the loudspeaker apparatus may include a driving device 101 (also referred to as a transducer in other embodiments), a transmission assembly 303, a panel 301, and a housing 302.

In some embodiments, a straight line where a driving force is along may be collinear or parallel to a straight line where the driving device 101 vibrates. For example, in the driving device 101 based on a moving coil principle, a direction of the driving force may be the same as or opposite to a vibration direction of a coil and/or a magnetic circuit assembly. The panel 301 may be flat or curved. Alternatively, the panel 301 may have a number of protrusions or grooves. In some embodiments, when the loudspeaker apparatus is worn on a user's body, a normal line of a region on the panel 301 that is in contact with or abuts on the user's body is not parallel to the straight line where the driving force is along. Generally speaking, the region on the panel 301 that is in contact with or abuts on the user's body may be relatively flat. Specifically, the region may be a plane or a quasi-plane with little curvature. When the region on the panel 301 used to contact with or abut on the user's body is a plane, a normal line of any point on the region may be used as a normal line of the region. When the region on the panel 301 used to contact with or abut on the user's body is not a plane, the normal line of the region may be an average normal line of the region. The detailed definition of the average normal line may be referred to the related description in FIG. 10, which will not be repeated herein. In some other embodiments, when the region on the panel used to contact with or abut on the user's body is not a plane, the normal line of the region may also be determined as follows: selecting a certain point in a region when the panel 301 is in contact with the human skin, determining a tangent plane of the panel 301 at this point, determining a straight line that passes through the point and is perpendicular to the tangent plane, and designating the straight line as the normal line of the panel. According to a specific embodiment of the present disclosure, the straight line where the driving force is along (or the straight line where the driving device 101 vibrates) may have an included angle $\theta$ with the normal line of the region, and the included angle may be in a range of 0 to 180 degrees. In some specific embodiments, when the straight line where the driving force is along has a positive direction pointing out of the loudspeaker apparatus through the panel (or a contact surface of the panel and/or the housing and the human skin) and the normal line of the panel (or the contact surface of the panel 301 and/or the housing 302 and the human body) has a positive direction pointing out of the loudspeaker apparatus, the included angle formed by the two straight lines in the positive direction may be an acute angle.

In some embodiments, a coil 304 and a magnetic circuit assembly 307 may be both ring-shaped structures. In some embodiments, the coil 304 and the magnetic circuit assembly 307 may have axes parallel to each other. The axis of the coil 304 or the magnetic circuit assembly 307 may be perpendicular to a radial plane of the coil 304 and/or a radial plane of the magnetic circuit assembly 307. In some embodiments, the coil 304 and the magnetic circuit assembly 307 may have a same central axis. The central axis of the coil 304 may be perpendicular to the radial plane of the coil 304 and pass through a geometric center of the coil 304. The central axis of the magnetic circuit component 307 may be perpendicular to the radial plane of the magnetic circuit component 307 and pass through a geometric center of the magnetic circuit component 307. The axis of the coil 304 or the magnetic circuit assembly 307 and the normal line of the panel 301 may form the aforementioned angle θ.

In some embodiments, the magnetic circuit assemblies in the above embodiments may have a same structure, which may refer to structures that provide magnetic fields. The coils in the above embodiments may also have a same structure, which may refer to structures that receive external electrical signals and convert the electrical signals into mechanical vibration signals under an action of a magnetic field.

Merely by way of example, referring to FIG. 13, a relationship between a driving force F and a skin deformation S may be explained below. When the straight line where the driving force generated by the driving device 101 is along is parallel to the normal line of the panel 301 (i.e., the included angle is zero), the relationship between the driving force and a total skin deformation may be:

$$F_\perp = S_\perp \times E \times A/h \quad (2)$$

where $F_\perp$ is the driving force, $S_\perp$ is the total deformation of the skin in a direction perpendicular to the skin, E is an elastic modulus of the skin, A is a contact area between the panel 301 and the skin, and h is a total thickness of the skin (i.e., a distance between the panel and the bone).

When the straight line where the driving force of the driving device 101 is along is perpendicular to the normal line of the region on the panel that is in contact with or abuts on the user's body (i.e., the angle θ is 90 degrees), a relationship between the driving force in a vertical direction and the total skin deformation may be determined as Equation:

$$F_\| = S_\| \times G \times A/h \quad (3)$$

As used herein, $F_\|$ is a magnitude of the driving force, $S_\|$ is a total deformation of the skin in a direction parallel to the skin, G is a shear modulus of the skin, A is the contact area between the panel 301 and the skin, and h is the total thickness of the skin (i.e., the distance between the panel and the bone). The relationship between the shear modulus G and the elastic modulus E may be:

$$G = E/2(1+\gamma) \quad (4)$$

where γ is the Poisson's ratio of the skin, 0<γ<0.5, so the shear modulus G may be smaller than the elastic modulus E, correspondingly, the total deformation of the skin may be $S_\| > S_\perp$ under a same driving force. Generally, the Poisson's ratio of the skin may be close to 0.4.

When the straight line where the driving force is generated by the driving device 101 is not parallel to the normal line of the region where the panel 301 is in contact with the user's body, a horizontal driving force and a vertical driving force may be expressed as the following Equation (5) and Equation (6), respectively:

$$F_\perp = F \times \cos(\theta) \quad (5)$$

$$F_\| = F \times \sin(\theta) \quad (6)$$

As used herein, a relationship between driving force F and skin deformation S may be expressed by the following equation (5):

$$S = \sqrt[2]{S_\perp^2 + S_\|^2} = \frac{h}{A} \times F \times \sqrt[2]{(\cos(\theta)/E)^2 + (\sin(\theta)/G)^2} \quad (7)$$

Figure 13:
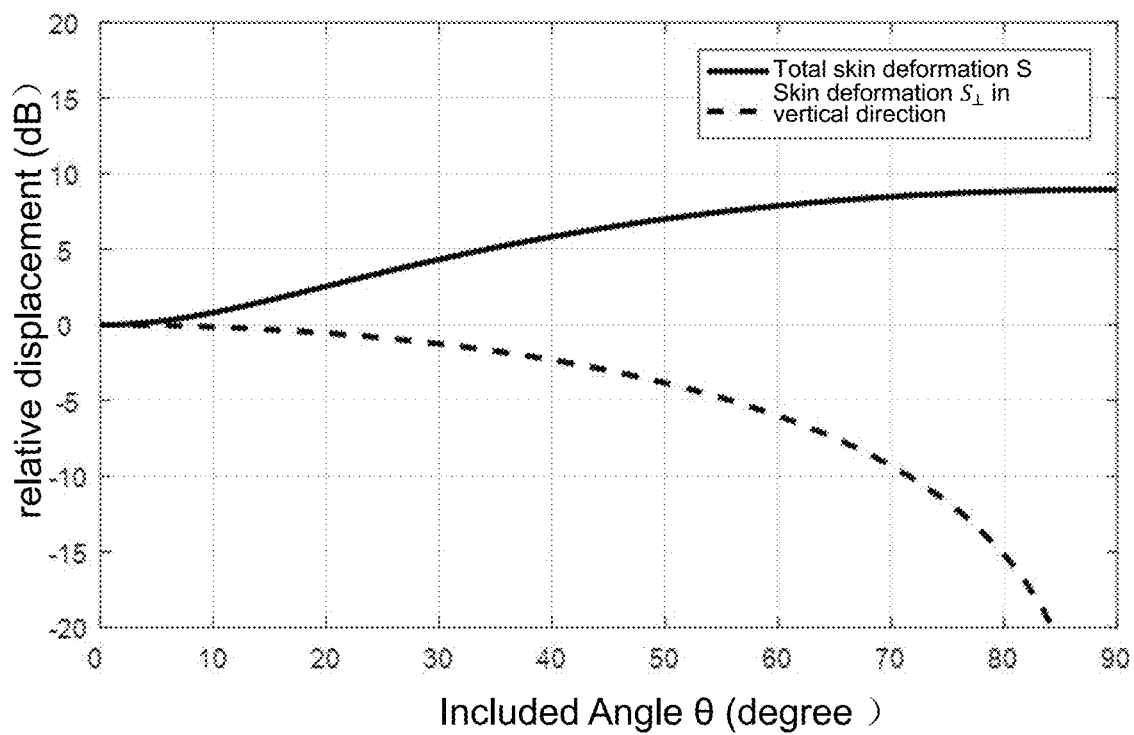
FIG. 13 is a diagram illustrating a relationship between an included angle and a relative displacement of a loudspeaker apparatus according to some embodiments of the present disclosure.

When the Poisson's ratio of the skin is 0.4, the detailed description of the relationship between the included angle and the total skin deformation may be found in FIG. 13.

FIG. 13 is a diagram illustrating a relationship of an included angle and a relative displacement of a loudspeaker apparatus according to some embodiments of the present disclosure. As shown in FIG. 13, the relationship between the included angle θ and a total skin deformation may be that the larger the included angle θ, the greater the relative displacement, and the greater the total skin deformation S. As the included angle increases, the relative displacement may decrease, and the skin deformation $S_\perp$ of the skin in the vertical direction may decrease. When the included angle is close to 90 degrees, the skin deformation $S_\perp$ of the skin in the vertical direction may gradually tend to zero.

In some embodiments, a volume of the loudspeaker apparatus in a low frequency part may be positively correlated with the total skin deformation S. The greater the S, the greater the volume in the low frequency. The volume of the loudspeaker apparatus in a high frequency part may be positively correlated with the skin deformation $S_\perp$ in the vertical direction. The bigger the skin deformation $S_\perp$ in the vertical direction, the greater the volume in the high frequency.

Figure 14:
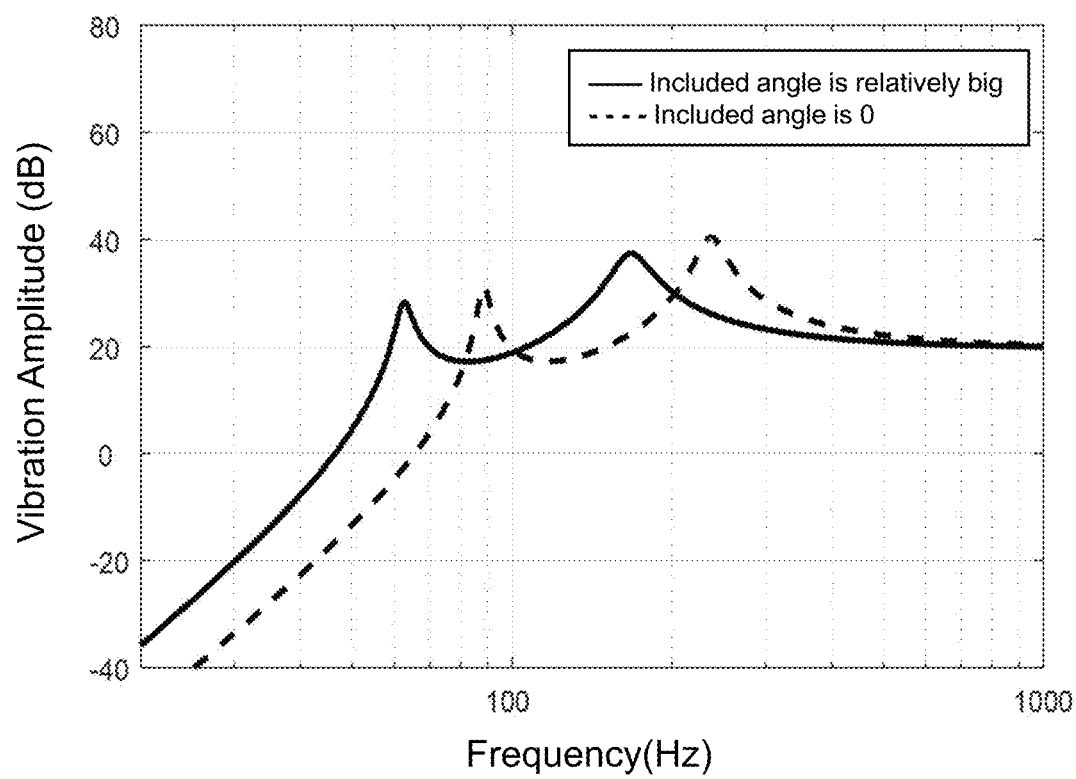
FIG. 14 is a schematic diagram illustrating a low-frequency part of a frequency response curve of a loudspeaker apparatus with different included angles θ according to some embodiments of the present disclosure.

Further, when the Poisson's ratio of the skin is 0.4, the detailed description of the relationship between the included angle θ and the total skin deformation S and the relationship between the included angle θ and the skin deformation $S_\perp$ in the vertical direction may be found in FIG. 14. As shown in FIG. 14, the relationship between the included angle θ and the total skin deformation S may be that the greater the included angle θ, the greater the total skin deformation S, and the greater the corresponding volume of the loudspeaker apparatus in the low frequency. As shown in FIG. 13, the relationship between the included angle θ and the skin deformation $S_\perp$ in the vertical direction may be that the greater the included angle θ, the smaller the skin deformation $S_\perp$ in the vertical direction, and the smaller the corresponding volume of the loudspeaker apparatus in the high frequency.

According to Equation (7) and the curve in FIG. 13, with the increase of the included angle θ, a speed of the increase of the total deformation of skin S and a speed of the decrease of the skin deformation $S_\perp$ in the vertical direction may be different. The speed of the increase of the total deformation of skin S may be fast at first and then become slow, and the speed of the decrease of the skin deformation $S_\perp$ in the vertical direction may be faster and faster. To balance the volume of the low frequency and high frequency components of the loudspeaker apparatus, the included angle θ may be in a suitable range. For example, a range of θ may be 5-80 degrees, 15-70 degrees, 25-50 degrees, or 25-35 degrees, 25-30 degrees, etc.

FIG. 14 is a schematic diagram illustrating a low-frequency part of a frequency response curve of a loudspeaker apparatus with different included angles θ according to some embodiments of the present disclosure. As shown in FIG. 14, a panel 301 may be in contact with skin and transmit vibrations to the skin. In this process, the skin may also affect the vibration of the loudspeaker apparatus, thereby affecting the frequency response curve of the loudspeaker apparatus. According to the above analysis, it should be found that the greater the included angle, the greater a total deformation of the skin under a same driving force. For the loudspeaker apparatus, it may be equivalent to a reduction in the elasticity of the skin relative to the panel 301. It may be further understood that when a certain angle θ is formed between a straight line where the driving force of the driving device 101 is along and a normal line of a region on the panel 301 that is in contact with or abutting on a user's body, especially when the angle θ increases, a formant of the low frequency region in the frequency response curve may be adjusted to a lower frequency region, so that the low frequency may dive deeper and the low frequency may increase. Compared with other technical means to improve the low-frequency components of the sound, such as adding a vibration transmission plate to the loudspeaker apparatus, the included angle may effectively suppress the increase of the sense of vibration while increasing the low-frequency energy, thereby reducing the sense of vibration. Therefore, low-frequency sensitivity of the loudspeaker apparatus may be significantly improved, thereby improving sound quality and human experience. It should be noted that, in some embodiments, increasing the low frequency and decreasing the sense of vibration means that when the included angle θ increases in a range of 0 to 90 degrees, energy in the low frequency range of the vibration or sound signal may increase, and the sense of vibration may also increase simultaneously, but the energy in the low-frequency range has increased to a greater degree than the sense of vibration. Therefore, in terms of relative effects, the sense of vibration may be relatively decreased. According to FIG. 14, when the included angle is large, the formant in the low frequency region appears in a lower frequency range, which may extend a flat part of a frequency curvature in a disguised manner, thereby improving the sound quality of the loudspeaker apparatus.

It should be noted that the above description of the loudspeaker apparatus is only a specific example and should not be regarded as the only feasible implementation. Obviously, for those skilled in the art, after understanding the basic principle of the loudspeaker apparatus, it may be possible to make various modifications and variations in the form and details of the specific method and operation of implementing the loudspeaker apparatus without departing from these principles, but these modifications and variations are still within the scope described above. For example, a minimum angle θ between the straight line where the driving force is along and the normal line of the region on the panel used to contact with or abut on the user's body may be any acute angle. The acute angle herein may not be limited to the above 5-80 degrees. In some embodiments, the included angle θ may be less than 5 degrees, such as 1 degree, 2 degrees, 3 degrees, 4 degrees, etc. In other embodiments, the included angle θ may be greater than 80 degrees and less than 90 degrees, such as 81 degrees, 82 degrees, 85 degrees, etc. In some embodiments, the specific value of the included angle θ may not be an integer (e.g., 81.3 degrees, 81.38 degrees). Such deformations are all within the protection scope of the present disclosure.

Figure 15:
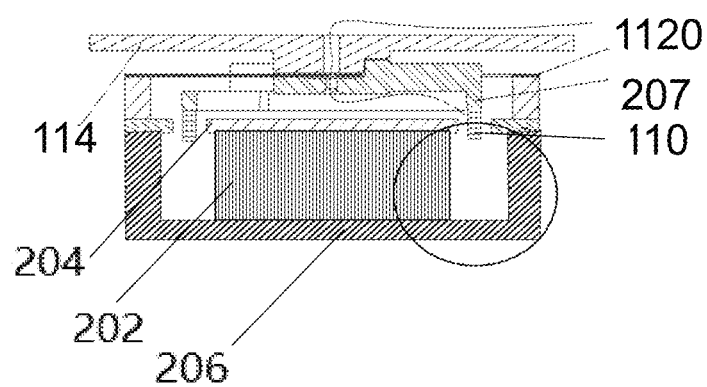
FIG. 15 is a schematic diagram illustrating a longitudinal sectional view of a magnetic circuit assembly according to some embodiments of the present disclosure.

FIG. 15 is a schematic diagram illustrating a longitudinal sectional view of a magnetic circuit assembly according to some embodiments of the present disclosure. It should be noted that, without departing from the principle, the content described below can be equally applied to the air conduction loudspeaker apparatus and the bone conduction loudspeaker apparatus.

As shown in FIG. 15, in some embodiments, the loudspeaker apparatus may include a first magnetic element 202, a first magnetic guide element 204, a second magnetic guide element 206, a first vibration plate 207, a voice coil 110, a second vibration plate 1120 and a vibration panel 114. As used herein, a portion of elements of the earphone core in the speaker may form a magnetic circuit assembly. In some embodiments, the magnetic circuit assembly may include the first magnetic element 202, the first magnetic guide element 204, and the second magnetic guide element 206. The magnetic circuit assembly may generate a first full magnetic field (also referred to as "total magnetic field of the magnetic circuit component" or "first magnetic field").

A magnetic element described in the present disclosure refers to an element that may generate a magnetic field, such as a magnet. The magnetic element may have a magnetization direction, and the magnetization direction may refer to a magnetic field direction inside the magnetic element. The first magnetic element 202 may include one or more magnets. The first magnetic element may generate a second magnetic field. In some embodiments, a magnet may include a metal alloy magnet, a ferrite, or the like. The metal alloy magnet may include a neodymium iron boron, a samarium cobalt, an aluminum nickel cobalt, an iron chromium cobalt, an aluminum iron boron, an iron carbon aluminum, or the like, or a combination thereof. The ferrite may include a barium ferrite, a steel ferrite, a manganese ferrite, a lithium manganese ferrite, or the like, or a combination thereof.

In some embodiments, the lower surface of the first magnetic guide element 204 may be connected with the upper surface of the first magnetic element 202. The second magnetic guide element 206 may be connected with the first magnetic element 202. It should be noted that a magnetic guide element used herein may also be referred to as a magnetic field concentrator or iron core. The magnetic guide element may adjust the distribution of the magnetic field (e.g., the magnetic field generated by the first magnetic element 202). The magnetic guide element may be made of a soft magnetic material. In some embodiments, the soft magnetic material may include a metal material, a metal alloy, a metal oxide material, an amorphous metal material, or the like, for example, an iron, an iron-silicon based alloy, an iron-aluminum based alloy, a nickel-iron based alloy, an iron-cobalt based alloy, a low carbon steel, a silicon steel sheet, a silicon steel sheet, a ferrite, or the like. In some embodiments, the magnetic guide element may be manufactured by a way of casting, plastic processing, cutting processing, powder metallurgy, or the like, or any combination thereof. The casting may include a sand casting, an investment casting, a pressure casting, a centrifugal casting, etc. The plastic processing may include a rolling, a casting, a forging, a stamping, an extrusion, a drawing, or the like, or any combination thereof. The cutting processing may include a turning, a milling, a planning, a grinding, etc. In some embodiments, the processing means of the magnetic guide element may include a 3D printing, a CNC machine tool, or the like. The connection means between the first magnetic guide element 204, the second magnetic guide element 206, and the first magnetic element 202 may include a bonding, a clamping, a welding, a riveting, a bolting, or the like, or any combination thereof. In some embodiments, the first magnetic element 202, the first magnetic guide element 204, and the second magnetic guide element 206 may be configured as an axisymmetric structure. The axisymmetric structure may be an annular structure, a columnar structure, or other axisymmetric structures.

In some embodiments, a magnetic gap may be formed between the first magnetic element 202 and the second magnetic guide element 206. The voice coil 110 may be located within the magnetic gap. The voice coil 110 may be connected with the first vibration plate 207. The first vibration plate 207 may be connected with the second vibration plate 1120, and the second vibration plate 1120 may be connected with the vibration panel 114. When a current is passed into the voice coil 110, and the voice coil 110 may be located in a magnetic field formed by the first magnetic element 202, the first magnetic guide element 204, and the second magnetic guide element 206, and affected by an ampere force generated under the magnetic field. The ampere force may drive the voice coil 110 to vibrate, and the vibration of the voice coil 110 may drive the vibration of the first vibration plate 207, the second vibration plate 1120 and the vibration panel 114. The vibration panel 114 may transmit the vibration to the auditory nerve through tissues and bones, so that a person hears the sound. The vibration panel 114 may directly contact the human skin, or may contact the skin through a vibration transmission layer composed of a specific material.

In some embodiments, for a loudspeaker apparatus with a single magnetic element, the magnetic induction lines passing through the voice coil 110 may be nonuniform and divergent. At the same time, a magnetic leakage may exist in the magnetic circuit. More magnetic induction lines may be outside the magnetic gap and fail to pass through the voice coil 110, so that the magnetic induction intensity (or magnetic field strength) at the position of the voice coil 110 decreases, thereby affecting the sensitivity of the loudspeaker apparatus. Therefore, the loudspeaker apparatus may further include at least one second magnetic element and/or at least one third magnetic guide element (not shown). The at least one second magnetic element and/or the at least one third magnetic guide element may suppress the leakage of the magnetic induction lines and restrict the shape of the magnetic induction lines passing through the voice coil 110, so that more magnetic lines pass through the voice coil 110 as horizontally and densely as possible to enhance the magnetic induction intensity (or magnetic field strength) at the position of the voice coil 110, thereby improving the sensitivity and the mechanical conversion efficiency of the loudspeaker apparatus (i.e., the efficiency of converting the electrical energy input into the loudspeaker apparatus 100 into the mechanical energy of the voice coil 110 vibration).

Figure 16:
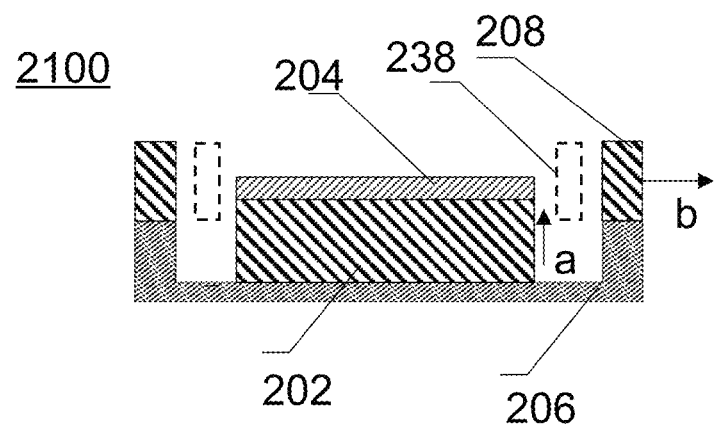
FIG. 16 is a schematic diagram illustrating a longitudinal sectional view of a magnetic circuit assembly according to some embodiments of the present disclosure.

FIG. 16 is a schematic diagram illustrating a longitudinal sectional view of a magnetic circuit assembly according to some embodiments of the present disclosure. As shown in FIG. 16, the magnetic circuit assembly 2100 may include the first magnetic element 202, the first magnetic guide element 204, the second magnetic guide element 206, and the second magnetic element 208.

In some embodiments, the magnetic circuit assemblies in the above embodiments may have a same structure, which may refer to structures that provide magnetic fields. In some embodiments, the first magnetic element 202 and/or the second magnetic element 208 may include one or more magnets as described in the present disclosure. In some embodiments, the first magnetic element 202 may include a first magnet, and the second magnetic element 208 may include a second magnet. The first magnet may be the same as or different from the second magnet in types. The first magnetic guide element 204 and/or the second magnetic guide element 206 may include one or more permeability magnetic materials as described in the present disclosure. The first magnetic guide element 204 and/or the second magnetic guide element 206 may be manufactured using any one or more processing means as described in the present disclosure. In some embodiments, the first magnetic element 202 and/or the first magnetic guide element 204 may be axisymmetric. For example, the first magnetic element 202 and/or the first magnetic guide element 204 may be a cylinder, a rectangle parallelepiped, or a hollow ring (e.g., the cross section is the shape of a runway). In some embodiments, the first magnetic element 202 and the first magnetic guide element 204 may be coaxial cylinders with the same or different diameters. In some embodiments, the second magnetic guide element 206 may be a groove-type structure. The groove-type structure may include a U-shaped cross section. The second magnetic guide element 206 with the groove-type structure may include a baseplate and a side wall. In some embodiments, the baseplate and the side wall may be integrally formed. For example, the side wall may be formed by extending the baseplate in a direction perpendicular to the baseplate. In some embodiments, the baseplate may be connected with the side wall through any one or more connection means as described in the present disclosure. The second magnetic element 208 may be provided in an annular shape or a sheet shape. In some embodiments, the second magnetic element 208 may be in an annular shape. In some embodiments, the second magnetic element 208 may include an inner ring and an outer ring. In some embodiments, the shape of the inner ring and/or the outer ring may be a circle, an ellipse, a trigon, a quadrangle, or any other polygon. In some embodiments, the second magnetic element 208 may be composed of a plurality of magnets arranged one by one. Two ends of any one of the plurality of magnets may be connected with or have a certain spacing from two ends of an adjacent magnet. The space between two adjacent magnets may be the same or different. In some embodiments, the second magnetic element 208 may be composed of two or three sheet-shaped magnets that are arranged equidistantly. The shape of the sheet-shaped magnets may be a fan shape, a quadrangular shape, or the like. In some embodiments, the second magnetic element 208 may be coaxial with the first magnetic element 202 and/or the first magnetic guide element 204.

Further, the upper surface of the first magnetic element 202 may be connected with the lower surface of the first magnetic guide element 204. The lower surface of the first magnetic element 202 may be connected with the baseplate of the second magnetic guide element 206. The lower surface of the second magnetic element 208 may be connected with the side wall of the second magnetic guide element 206. Connection means between the first magnetic element 202, the first magnetic guide element 204, the second magnetic guide element 206, and/or the second magnetic element 208 may include the bonding, the snapping, the welding, the riveting, the bolting, or the like, or any combination thereof.

In some embodiments, a magnetic gap may be configured between the first magnetic element 202 and/or the first magnetic guide element 204 and an inner ring of the second magnetic element 208. A voice coil 238 may be located within the magnetic gap. In some embodiments, the height of the second magnetic element 208 and the voice coil 238 relative to the baseplate of the second magnetic guide element 206 may be equal.

In some embodiments, the first magnetic element 202, the first magnetic guide element 204, the second magnetic guide element 206, and the second magnetic element 208 may form a magnetic circuit. In some embodiments, the magnetic circuit assembly 2100 may generate a first full magnetic field (also referred to as a "total magnetic field of the magnetic circuit assembly" or a "first magnetic field"), and the first magnetic element 202 may generate a second magnetic field. The first full magnetic field may be formed by the magnetic fields generated by all components in the magnetic circuit assembly 2100 (for example, the first magnetic element 202, the first magnetic guide element 204, the second magnetic guide element 206, and the second magnetic element 208).

In some embodiments, the magnetic field strength (also referred to as magnetic induction intensity or magnetic flux density) of the second magnetic field within the magnetic gap may exceed the magnetic field strength of the first magnetic field within the magnetic gap. In some embodiments, the second magnetic element 208 may generate a third magnetic field. The third magnetic field may increase the magnetic field strength of the total magnetic field within the magnetic gap. The third magnetic field increasing the magnetic field strength of the first magnetic field mentioned herein may refer to that the first full magnetic field including the third magnetic field (i.e., when the second magnetic element 208 exist) has a stronger magnetic field strength than the first full magnetic field not including the third magnetic field (i.e., when the second magnetic element 208 does not exist). In other embodiments in this disclosure, unless otherwise specified, the magnetic circuit assembly represents a structure including all magnetic elements and magnetic guide elements. The first magnetic field represents the total magnetic field generated by the magnetic circuit assembly as a whole. The second magnetic field, the third magnetic field, . . . , and the Nth magnetic field represent magnetic fields generated by corresponding magnetic elements, respectively. In different embodiments, a magnetic element that generates the second magnetic field (or the third magnetic field, . . . , Nth magnetic field) may be the same, and may be different.

In some embodiments, the voice coils in the above embodiments may have a same structure, which may refer to elements that transmit audio signals. The magnetic circuit assemblies in the above embodiments may have a same structure, which may refer to structures that provide magnetic fields.

In some embodiments, an included angle between the magnetization direction of the first magnetic element 202 and the magnetization direction of the second magnetic element 208 may be in a range from 0 to 180 degrees. In some embodiments, the included angle between the magnetization direction of the first magnetic element 202 and the magnetization direction of the second magnetic element 208 may be in a range from 45 degrees to 135 degrees. In some embodiments, the included angle between the magnetization direction of the first magnetic element 202 and the magnetization direction of the second magnetic element 208 may be equal to or greater than 90 degrees. In some embodiments, the magnetization direction of the first magnetic element 202 may be perpendicular to the lower surface or the upper surface of the first magnetic element 202 and be vertically upward (the direction denoted by arrow a in the figure). The magnetization direction of the second magnetic element 208 may be directed from the inner ring of the second magnetic element 208 to the outer ring (the direction denoted by arrow b in the figure, on the right side of the first magnetic element 202, the magnetization direction of the first magnetic element 202 deflected 90 degrees in a clockwise direction).

In some embodiments, at a position of the second magnetic element 208, an included angle between the direction of the total magnetic field and the magnetization direction of the second magnetic element 208 may be not higher than 90 degrees. In some embodiments, at the position of the second magnetic element 208, the included angle between the direction of the first magnetic field generated by the first magnetic element 202 and the magnetization direction of the second magnetic element 208 may be an included angle that is less than or equal to 90 degrees, such as 0 degrees, 10 degrees, 20 degrees, etc. Furthermore, compared with the magnetic circuit assembly including one single magnetic element, the second magnetic element 208 may increase the total magnetic flux within the magnetic gap in the magnetic circuit assembly 2100, thereby increasing the magnetic induction intensity within the magnetic gap. In addition, under the action of the second magnetic element 208, the magnetic induction lines that are originally divergent may converge to the position of the magnetic gap, further increasing the magnetic induction intensity within the magnetic gap.

Figure 17:
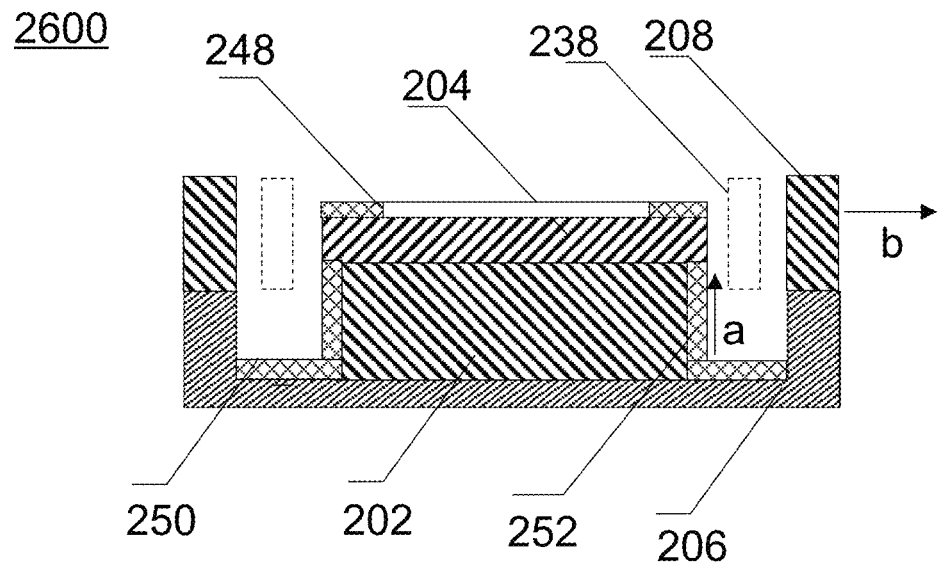
FIG. 17 is a schematic diagram illustrating a longitudinal sectional view of a magnetic circuit assembly according to some embodiments of the present disclosure.

FIG. 17 is a schematic diagram illustrating a longitudinal sectional view of a magnetic circuit assembly according to some embodiments of the present disclosure. As shown in FIG. 17, different from the magnetic circuit assembly 2100, the magnetic circuit assembly 2600 may further include one or more conductive elements (e.g., a first conductive element 248, a second conductive element 250, and a third conductive element 252).

In some embodiments, the conductive element may include a metal material, a metal alloy material, an inorganic non-metal material, or other conductive materials. The metal material may include a gold, a silver, a copper, an aluminum, etc. The metal alloy material may include an iron-based alloy, an aluminum-based alloy material, a copper-based alloy, a zinc-based alloy, etc. The inorganic non-metal material may include a graphite, etc. The conductive element may be in a sheet shape, an annular shape, a mesh shape, or the like. The first conductive element 248 may be located on the upper surface of the first magnetic guide element 204. The second conductive element 250 may be connected with the first magnetic element 202 and the second magnetic guide element 206. The third conductive element 252 may be connected with the side wall of the first magnetic element 202. In some embodiments, the first magnetic guide element 204 may protrude from the first magnetic element 202 to form a first concave portion, and the third conductive element 252 may be provided on the first concave portion. In some embodiments, the first conductive element 248, the second conductive element 250, and the third conductive element 252 may include the same or different conductive materials. The first conductive element 248, the second conductive element 250, and the third conductive element 252 may be respectively connected with the first magnetic guide element 204, the second magnetic guide element 206, and/or the first magnetic element 202 through one or more connection means as described elsewhere in the present disclosure.

In some embodiments, a magnetic gap may be configured between the first magnetic element 202, the first magnetic guide element 204, and the inner ring of the second magnetic element 208. The voice coil 238 may be located within the magnetic gap. The first magnetic element 202, the first magnetic guide element 204, the second magnetic guide element 206, and the second magnetic element 208 may form the magnetic circuit. In some embodiments, the one or more conductive elements may reduce the inductive reactance of the voice coil 238. For example, if a first alternating current flows into the voice coil 238 a first alternating induction magnetic field may be generated near the voice coil 238. Under the action of the magnetic field in the magnetic circuit, the first alternating induction magnetic field may cause the voice coil 238 to generate inductive reactance and hinder the movement of the voice coil 238. When the one or more conductive elements (e.g., the first conductive element 248, the second conductive element 250, and the third conductive element 252) are configured near the voice coil 238, under the action of the first alternating induction magnetic field, the conductive elements may induce a second alternating current. A third alternating current in the conductive elements may generate a second alternating induction magnetic field near the conductive elements. The direction of the second alternating magnetic field may be opposite to the direction of the first alternating induction magnetic field, and the first alternating induction magnetic field may be weakened, thereby reducing the inductive reactance of the voice coil 238, increasing the current in the voice coil, and improving the sensitivity of the loudspeaker apparatus.

Figure 18:
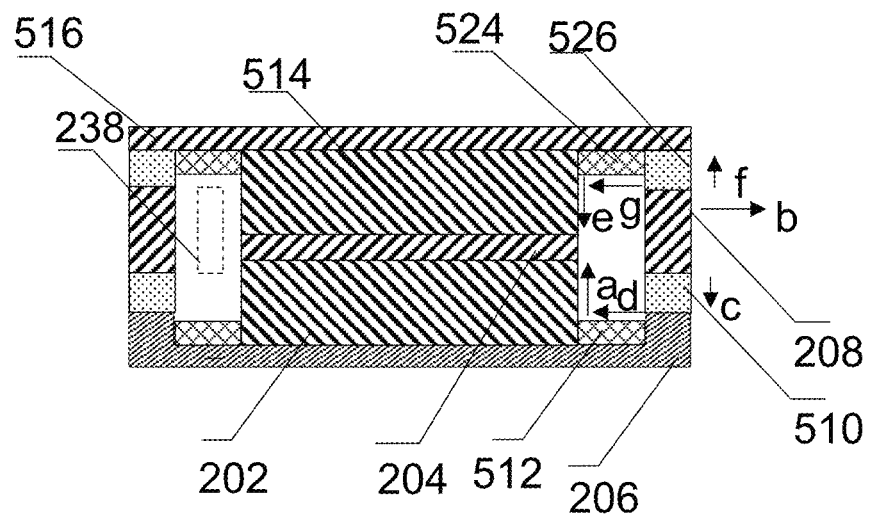
FIG. 18 is a schematic diagram illustrating a longitudinal sectional view of a magnetic circuit assembly according to some embodiments of the present disclosure.

FIG. 18 is a schematic diagram illustrating a longitudinal sectional view of a magnetic circuit assembly according to some embodiments of the present disclosure. As shown in FIG. 18, different from the magnetic circuit assembly 2600, the magnetic circuit assembly 2700 may further include the third magnetic element 510, the fourth magnetic element 512, a fifth magnetic element 514, a third magnetic guide element 516, and a sixth magnetic element 524 and a seventh magnetic element 526. The third magnetic element 510, the fourth magnetic element 512, the fifth magnetic element 514, the third magnetic guide element 516 and/or the sixth magnetic element 524, and the seventh magnetic element 526 may be provided as coaxial circular cylinders.

All of the magnetic circuit assemblies in the above embodiments may refer to structures that provide magnetic fields.

In some embodiments, the upper surface of the second magnetic element 208 may be connected with the seventh magnetic element 526, and the lower surface of the second magnetic element 208 may be connected with the third magnetic element 510. The third magnetic element 510 may be connected with the second magnetic guide element 206. The upper surface of the seventh magnetic element 526 may be connected with the third magnetic guide element 516. The fourth magnetic element 512 may be connected with the second magnetic guide element 206 and the first magnetic element 202. The sixth magnetic element 524 may be connected with the fifth magnetic element 514, the third magnetic guide element 516 and the seventh magnetic element 526. In some embodiments, the first magnetic element 202, the first magnetic guide element 204, the second magnetic guide element 206, the second magnetic element 208, the third magnetic element 510, the fourth magnetic element 512, the fifth magnetic element 514, the third magnetic guide element 516, the sixth magnetic element 524, and the seventh magnetic element 526 may form the magnetic circuit and the magnetic gap.

In some embodiments, an included angle between the magnetization direction of the first magnetic element 202 and the magnetization direction of the sixth magnetic element 524 may be in a range from 0 to 180 degrees. In some embodiments, the included angle between the magnetization direction of the first magnetic element 202 and the magnetization direction of the sixth magnetic element 524 may be in a range from 45 degrees to 135 degrees. In some embodiments, the included angle between the magnetization direction of the first magnetic element 202 and the magnetization direction of the sixth magnetic element 524 may not be higher than 90 degrees. In some embodiments, the magnetization direction of the first magnetic element 202 may be perpendicular to the lower surface or the upper surface of the first magnetic element 202 vertically upward (the direction denoted by arrow a in the figure). The magnetization direction of the sixth magnetic element 524 may be directed from the outer ring of the sixth magnetic element 524 to the inner ring (the direction denoted by arrow g in the figure. On the right side of the first magnetic element 202, the magnetization direction of the first magnetic element 202 deflected 270 degrees in a clockwise direction). In some embodiments, in the same vertical direction, the magnetization direction of the sixth magnetic element 524 may be the same as the magnetization direction of the fourth magnetic element 512.

In some embodiments, at some positions of the sixth magnetic element 524, the included angle between the direction of the magnetic field generated by the magnetic circuit assembly 2700 and the magnetization direction of the sixth magnetic element 524 may not be higher than 90 degrees. In some embodiments, at the position of the sixth magnetic element 524, the included angle between the direction of the magnetic field generated by the first magnetic element 202 and the magnetization direction of the sixth magnetic element 524 may be an included angle that is less than or equal to 90 degrees, such as 0 degrees, 10 degrees, 20 degrees, etc.

In some embodiments, an included angle between the magnetization direction of the first magnetic element 202 and the magnetization direction of the seventh magnetic element 526 may be in a range from 0 to 180 degrees. In some embodiments, the included angle between the magnetization direction of the first magnetic element 202 and the magnetization direction of the seventh magnetic element 526 may be in a range from 45 degrees to 135 degrees. In some embodiments, the included angle between the magnetization direction of the first magnetic element 202 and the magnetization direction of the seventh magnetic element 526 may not be higher than 90 degrees. In some embodiments, the magnetization direction of the first magnetic element 202 may be perpendicular to the lower surface or the upper surface of the first magnetic element 202 vertically upward (the direction of denoted by arrow a in the figure). The magnetization direction of the seventh magnetic element 526 may be directed from the lower surface of the seventh magnetic element 526 to the upper surface (the direction denoted by arrow fin the figure. On the right side of the first magnetic element 202, the magnetization direction of the first magnetic element 202 deflected 360 degrees in a clockwise direction). In some embodiments, the magnetization direction of the seventh magnetic element 526 may be opposite to the magnetization direction of the third magnetic element 510.

In some embodiments, at some seventh magnetic element 526, the included angle between the direction of the magnetic field generated by the magnetic circuit assembly 2700 and the magnetization direction of the seventh magnetic element 526 may not be higher than 90 degrees. In some embodiments, at the position of the seventh magnetic element 526, the included angle between the direction of the magnetic field generated by the first magnetic element 202 and the magnetization direction of the seventh magnetic element 526 may be an included angle that is less than or equal to 90 degrees, such as 0 degrees, 10 degrees, 20 degrees, etc.

In the magnetic circuit assembly 2700, the third magnetic guide element 516 may close the magnetic circuit generated by the magnetic circuit assembly 2700, so that more magnetic induction lines are concentrated within the magnetic gap, thereby achieving the effects of suppressing magnetic leakage, increasing magnetic induction intensity within the magnetic gap, and improving the sensitivity of the speaker.

Figure 19:
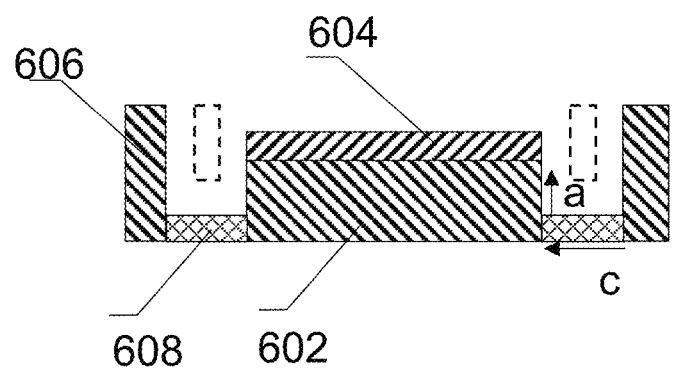
FIG. 19 is a schematic diagram illustrating a longitudinal sectional view of a magnetic circuit assembly according to some embodiments of the present disclosure.

FIG. 19 is a schematic diagram illustrating a longitudinal sectional view of a magnetic circuit assembly according to some embodiments of the present disclosure. As shown in FIG. 19, the magnetic circuit assembly 3100 may include a first magnetic element 602, a first magnetic guide element 604, a first full magnetic field changing element 606, and a second magnetic element 608.

In some embodiments, the first magnetic element(s) in the above embodiments may refer to an element(s) that stores energy, convert energy, and conduct electrical isolation. Similarly, the second magnetic element(s) also follows this principle. All the magnetic guide elements in the above embodiments may refer to elements that form a magnetic field loop.

In some embodiments, the upper surface of the first magnetic element 602 may be connected with the lower surface of the first magnetic guide element 604, and the second magnetic element 608 may be connected with the first magnetic element 602 and the first full magnetic field changing element 606. The connection means between the first magnetic element 602, the first magnetic guide element 604, the first full magnetic field changing element 606, and/or the second magnetic element 608 may be based on any one or more connection means as described elsewhere in the present disclosure. In some embodiments, the first magnetic element 602, the first magnetic guide element 604, the first full magnetic field changing element 606, and/or the second magnetic element 608 may form the magnetic circuit and the magnetic gap.

In some embodiments, the magnetic circuit assembly 3100 may generate the first magnetic field, and the first magnetic element 602 may generate the second magnetic field. The magnetic field strength of the first magnetic field within the magnetic gap may exceed the magnetic field strength of the second magnetic field within the magnetic gap. In some embodiments, the second magnetic element 608 may generate a third magnetic field, and the third magnetic field may increase the magnetic field strength of the second magnetic field within the magnetic gap.

In some embodiments, the included angle between the magnetization direction of the first magnetic element 602 and the magnetization direction of the second magnetic element 608 may be in a range from 0 to 180 degrees. In some embodiments, the included angle between the magnetization direction of the first magnetic element 602 and the magnetization direction of the second magnetic element 608 may be in a range from 45 degrees to 135 degrees. In some embodiments, the included angle between the magnetization direction of the first magnetic element 602 and the magnetization direction of the second magnetic element 608 may be not higher than 90 degrees.

In some embodiments, at some locations of the second magnetic element 608, the included angle between the direction of the first magnetic field and the magnetization direction of the second magnetic element 608 may not be higher than 90 degrees. In some embodiments, at the position of the second magnetic element 608, the included angle between the direction of the magnetic field generated by the first magnetic element 602 and the magnetization direction of the second magnetic element 608 may be an included angle that is less than or equal to 90 degrees, such as 0 degrees, 10 degrees, 20 degrees, etc. As another example, the magnetization direction of the first magnetic element 602 may be perpendicular to the lower surface or the upper surface of the first magnetic element 602 vertically upward (the direction denoted by arrow a in the figure). The magnetization direction of the second magnetic element 608 may be directed from the outer ring of the second magnetic element 608 to the inner ring (the direction denoted by arrow c in the figure. On the right side of the first magnetic element 602, the magnetization direction of the first magnetic element 602 deflected 270 degrees in a clockwise direction). Compared with the magnetic circuit assembly of a single magnetic element, the first full magnetic field changing element 606 in the magnetic circuit assembly 3100 may increase the total magnetic flux within the magnetic gap, thereby increasing the magnetic induction intensity within the magnetic gap. In addition, under the action of the first full magnetic field changing element 606, the magnetic induction lines that are originally divergent may converge to the position of the magnetic gap, further increasing the magnetic induction intensity within the magnetic gap.

Figure 20:
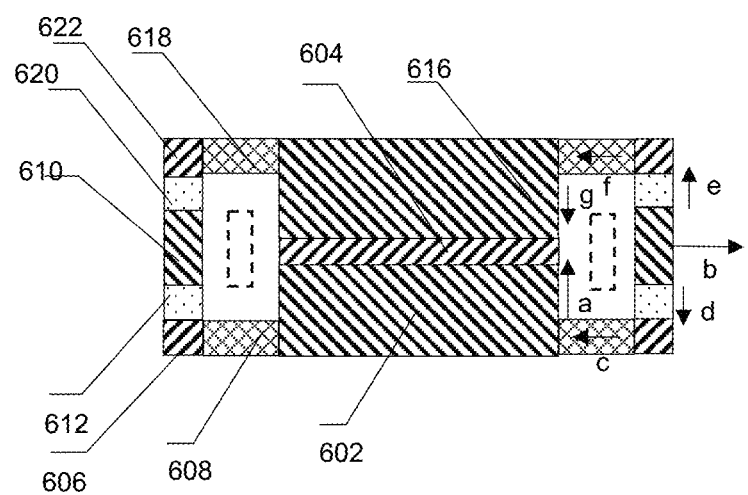
FIG. 20 is a schematic diagram illustrating a longitudinal sectional view of a magnetic circuit assembly according to some embodiments of the present disclosure.

FIG. 20 is a schematic diagram illustrating a longitudinal sectional view of a magnetic circuit assembly according to some embodiments of the present disclosure. Please refer to FIG. 20. In some embodiments, the magnetic circuit assembly 3700 may include the first magnetic element 602, the first magnetic guide element 604, the first full magnetic field changing element 606, the second magnetic element 608, the third magnetic element 610, the third magnetic element 610, the fourth magnetic element 612, the fifth magnetic element 616, a sixth magnetic element 618, a seventh magnetic element 620, and a second annular element 622. In some embodiments, the first full magnetic field changing element 606 and/or the second ring element 622 may include the annular magnetic element or an annular magnetic guide element.

In some embodiments, the annular magnetic element may include any one or more magnetic materials described in the present disclosure, and the annular magnetic guide element may include any one or more magnetically conductive materials described in the present disclosure. In some embodiments, the magnetic circuit assemblies in the above embodiments may refer to structures that provide magnetic fields. In some embodiments, the magnetic elements in the above embodiments may refer to elements that store energy, convert energy, and conduct electrical isolation. And the magnetic guide elements in the above embodiments may refer to elements that form a magnetic field loop.

In some embodiments, the sixth magnetic element 618 may be connected with the fifth magnetic element 616 and the second ring element 622, and the seventh magnetic element 620 may be connected with the third magnetic element 610 and the second ring element 622. In some embodiments, the first magnetic element 602, the fifth magnetic element 616, the second magnetic element 608, the third magnetic element 610, the fourth magnetic element 612, the sixth magnetic element 618, and/or the seventh magnetic element 620 and the first magnetic guide element 604, the first full magnetic field changing element 606, and the second ring element 622 may form the magnetic circuit.

In some embodiments, the included angle between the magnetization direction of the first magnetic element 602 and the magnetization direction of the sixth magnetic element 618 may be in a range from 0 to 180 degrees. In some embodiments, the included angle between the magnetization direction of the first magnetic element 602 and the magnetization direction of the sixth magnetic element 618 may be in a range from 45 degrees to 135 degrees. In some embodiments, the included angle between the magnetization direction of the first magnetic element 602 and the magnetization direction of the sixth magnetic element 618 may not be higher than 90 degrees. In some embodiments, the magnetization direction of the first magnetic element 602 may be perpendicular to the lower surface or the upper surface of the first magnetic element 602 vertically upward (the direction denoted by arrow a in the figure). The magnetization direction of the sixth magnetic element 618 may be directed from the outer ring of the sixth magnetic element 618 to the inner ring (the direction denoted by arrow fin the figure. On the right side of the first magnetic element 602, the magnetization direction of the sixth magnetic element 618 may be same as the magnetization direction of the first magnetic element 602 deflected 270 degrees in a clockwise direction). In some embodiments, in the same vertical direction, the magnetization direction of the sixth magnetic element 618 may be the same as the magnetization direction of the second magnetic element 608. In some embodiments, the magnetization direction of the first magnetic element 602 may be perpendicular to the lower surface or the upper surface of the first magnetic element 602 vertically upward (the direction denoted by arrow a in the figure). The magnetization direction of the seventh magnetic element 620 may be directed from the lower surface of the seventh magnetic element 620 to the upper surface (the direction denoted by arrow e in the figure. On the right side of the first magnetic element 602, the magnetization direction of the first magnetic element 602 deflected 360 degrees in a clockwise direction). In some embodiments, the magnetization direction of the seventh magnetic element 620 may be the same as the magnetization direction of the third magnetic element 612.

In some embodiments, at the position of the sixth magnetic element 618, the included angle between the direction of the magnetic field generated by the magnetic circuit assembly 3700 and the magnetization direction of the sixth magnetic element 618 may not be higher than 90 degrees. In some embodiments, at the position of the sixth magnetic element 618, the included angle between the direction of the magnetic field generated by the first magnetic element 602 and the magnetization direction of the sixth magnetic element 618 may be an included angle that is less than or equal to 90 degrees, such as 0 degrees, 10 degrees, 20 degrees, etc.

In some embodiments, the included angle between the magnetization direction of the first magnetic element 602 and the magnetization direction of the seventh magnetic element 620 may be in a range from 0 to 180 degrees. In some embodiments, the included angle between the magnetization direction of the first magnetic element 602 and the magnetization direction of the seventh magnetic element 620 may be in a range from 45 degrees to 135 degrees. In some embodiments, the included angle between the magnetization direction of the first magnetic element 602 and the magnetization direction of the seventh magnetic element 620 may not be higher than 90 degrees.

In some embodiments, at the position of the seventh magnetic element 620, the included angle between the direction of the magnetic field generated by the magnetic circuit assembly 3700 and the magnetization direction of the seventh magnetic element 620 may not be higher than 90 degrees. In some embodiments, at the position of the seventh magnetic element 620, the included angle between the direction of the magnetic field generated by the first magnetic element 602 and the magnetization direction of the seventh magnetic element 620 may be an included angle that is less than or equal to 90 degrees, such as 0 degrees, 10 degrees, 20 degrees, etc.

In some embodiments, the first full magnetic field changing element 606 may be the annular magnetic element. In this case, the magnetization direction of the first full magnetic field changing element 606 may be the same as the magnetization direction of the second magnetic element 608 or the fourth magnetic element 612. For example, on the right side of the first magnetic element 602, the magnetization direction of the first full magnetic field changing element 606 may be directed from the outer ring of the first full magnetic field changing element 606 to the inner ring. In some embodiments, the second ring element 622 may be the annular magnetic element. In this case, the magnetization direction of the second ring element 622 may be the same as that of the sixth magnetic element 618 or the seventh magnetic element 620. For example, on the right side of the first magnetic element 602, the magnetization direction of the second ring element 622 may be directed from the outer ring of the second ring element 622 to the inner ring. In the magnetic circuit assembly 3700, a plurality of magnetic elements may increase the total magnetic flux, the interaction of the different magnetic elements may suppress the leakage of magnetic induction lines, increase magnetic induction intensity within the magnetic gap, and improve the sensitivity of the loudspeaker apparatus.

In some embodiments, based on the magnetic circuit assembly 3700, the magnetic circuit assembly may further include a magnetic shield. The magnetic shield may include any one or more magnetically conductive materials described in the present disclosure, for example, a low carbon steel, a silicon steel sheet, a silicon steel sheet, a ferrite, etc. The magnetic shield may be connected to the first magnetic element 602, the first full magnetic field changing element 606, the second magnetic element 608, the third magnetic element 610, the fourth magnetic element 612, the fifth magnetic element 616, the sixth magnetic element 618, the seventh magnetic element 620, and the second annular element 622 through any one or more connection means described in the present disclosure. In some embodiments, the magnetic shield may include at least one baseplate and a side wall, and the side wall may have a ring structure. In some embodiments, the baseplate and the side wall may be integrally formed. In some embodiments, the baseplate may be connected to the side wall through any one or more connection means described in the present disclosure. For example, the magnetic shield may include a first baseplate, a second baseplate, and a side wall. The first baseplate and the side wall may be integrally formed, and the second baseplate may be connected to the side wall through any one or more connection means described in the present disclosure.

In the magnetic circuit assembly 3700, the magnetic shield may close the magnetic circuit generated by the magnetic circuit assembly 3700, so that more magnetic induction lines are concentrated within the magnetic gap of the magnetic circuit assembly 3700, thereby achieving the effects of suppressing magnetic leakage, increasing magnetic induction intensity within the magnetic gap, and improving the sensitivity of the loudspeaker apparatus.

It should be noted that all the magnetic circuit assemblies in the above embodiments may refer to structures that provide magnetic fields.

In some embodiments, based on the magnetic circuit assembly 3700, the magnetic circuit assembly may further include one or more conductive elements (e.g., a fourth conductive element, a fifth conductive element, and a sixth conductive element). The descriptions of the fourth conductive element, the fifth conductive element, and the sixth conductive element may be similar to the first conductive element 248, the second conductive element 250 and the third conductive element 252, and the related descriptions are not repeated here.

Figure 21:
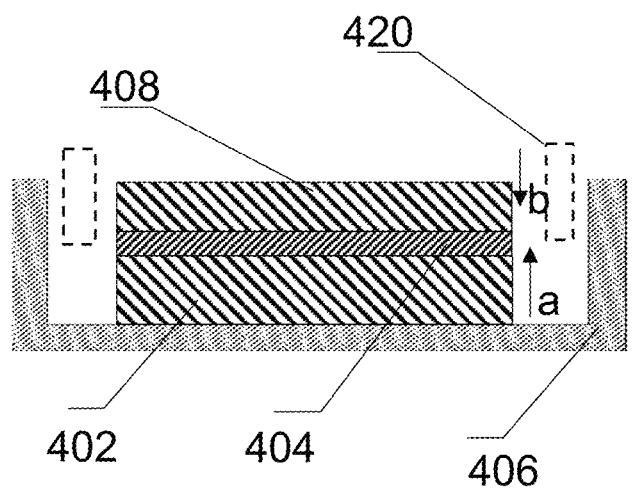
FIG. 21 is a schematic diagram illustrating a longitudinal sectional view of a magnetic circuit assembly according to some embodiments of the present disclosure.

FIG. 21 is a schematic diagram illustrating a longitudinal sectional view of a magnetic circuit assembly according to some embodiments of the present disclosure. As shown in FIG. 21, the magnetic circuit assembly 4100 may include a first magnetic element 402, a first magnetic guide element 404, a second magnetic guide element 406, and a second magnetic element 408.

It should be noted that the magnetic circuit assemblies in the above embodiments may refer to structures that provide magnetic fields. The magnetic elements in the above embodiments may refer to elements that store energy, convert energy, and conduct electrical isolation. The magnetic guide elements in the above embodiments may refer to elements that form a magnetic field loop.

In some embodiments, the first magnetic element 402 and/or the second magnetic element 408 may include any one or more magnets described in the present disclosure. In some embodiments, the first magnetic element 402 may include the first magnet, and the second magnetic element 408 may include the second magnet. The first magnet may be the same as or different from the second magnet. The first magnetic guide element 404 and/or the second magnetic guide element 406 may include any one or more magnetic conductive materials described in the present disclosure. The processing means of the first magnetic guide element 404 and/or the second magnetic guide element 406 may include any one or more processing means as described elsewhere in the present disclosure. In some embodiments, the first magnetic element 402, the first magnetic guide element 404, and/or the second magnetic element 408 may be provided as the axisymmetric structure. For example, the first magnetic element 402, the first magnetic guide element 404, and/or the second magnetic element 408 may be cylinders. In some embodiments, the first magnetic element 402, the first magnetic guide element 404, and/or the second magnetic element 408 may be coaxial cylinders with the same or different diameters. The thickness of the first magnetic element 402 may exceed or equal to the thickness of the second magnetic element 408. In some embodiments, the second magnetic guide element 406 may be the groove-type structure. The groove-type structure may include the U-shaped cross section. The groove-type second magnetic guide element 406 may include the baseplate and the side wall. In some embodiments, the baseplate and the side wall may be integrally formed. For example, the side wall may be formed by extending the baseplate in the direction perpendicular to the baseplate. In some embodiments, the baseplate may be connected with the side wall through one or more connection means as described elsewhere in the present disclosure. The second magnetic element 408 may be provided in the annular shape or the sheet shape. For the shape of the second magnetic element 408, reference may be made to descriptions elsewhere in the specification. In some embodiments, the second magnetic element 408 may be coaxial with the first magnetic element 402 and/or the first magnetic guide element 404.

Further, the upper surface of the first magnetic element 402 may be connected with the lower surface of the first magnetic guide element 404. The lower surface of the first magnetic element 402 may be connected with the baseplate of the second magnetic guide element 406. The lower surface of the second magnetic element 408 may be connected with the upper surface of the first magnetic guide element 404. The connection means between the first magnetic element 402, the first magnetic guide element 404, the second magnetic guide element 406, and/or the second magnetic element 408 may include the bonding, the snapping, the welding, the riveting, the bolting, or the like, or any combination thereof.

Further, the magnetic gap may be configured between the first magnetic element 402, the first magnetic guide element 404, and/or the second magnetic element 408 and the side wall of the second magnetic guide element 406. The voice coil may be disposed within the magnetic gap. In some embodiments, the first magnetic element 402, the first magnetic guide element 404, the second magnetic guide element 406, and the second magnetic element 408 may form the magnetic circuit. In some embodiments, the magnetic circuit assembly 4100 may generate the first magnetic field, and the first magnetic element 402 may generate the second magnetic field. The first magnetic field may be jointly formed by magnetic fields generated by all components (e.g., the first magnetic element 402, the first magnetic guide element 404, the second magnetic guide element 406, and the second magnetic element 408) in the magnetic circuit assembly 4100. The magnetic field strength of the first magnetic field within the magnetic gap (may also be referred to as magnetic induction intensity or magnetic flux density) may exceed the magnetic field strength of the second magnetic field within the magnetic gap. In some embodiments, the second magnetic element 408 may generate the third magnetic field, and the third magnetic field may increase the magnetic field strength of the second magnetic field within the magnetic gap.

In some embodiments, the included angle between the magnetization direction of the second magnetic element 408 and the magnetization direction of the first magnetic element 402 may be in a range from 90 degrees to 180 degrees. In some embodiments, the included angle between the magnetization direction of the second magnetic element 408 and the magnetization direction of the first magnetic element 402 may be in a range from 150 degrees to 180 degrees. In some embodiments, the magnetization direction of the second magnetic element 408 may be opposite to the magnetization direction of the first magnetic element 402 (as shown in the figure, in the direction of a and in the direction of b).

Compared with the magnetic circuit assembly of the single magnetic element, the magnetic circuit assembly 4100 may add the second magnetic element 408. The magnetization direction of the second magnetic element 408 may be opposite to the magnetization direction of the first magnetic element 402, which can suppress the magnetic leakage of the first magnetic element 402 in the magnetization direction, so that the magnetic field generated by the first magnetic element 402 may be more compressed into the magnetic gap, thereby increasing the magnetic induction intensity within the magnetic gap.

It should be noted that, the above description of the loudspeaker apparatus may be only a specific example, and should not be considered as the only feasible implementation. Obviously, for skilled in the art, after understanding the basic principles of the loudspeaker apparatus, it is possible to make various modifications and changes in the form and details of the specific means and steps of implementing the speaker without departing from this principle, but these modifications and changes are still within the scope described above. For example, the connecting surface between the first magnetic field changing element and the second magnetic element is not limited to the plane shown in figures, and the connecting surface may also include a wedge-shaped cross section, which may make the magnetic line of induction turn smoothly. For example, magnetic elements in the magnetic circuit assembly may not be limited to the first magnetic element, the second magnetic element, the third magnetic element, the fourth magnetic element, the fifth magnetic element, the sixth magnetic element, the seventh magnetic element. The count of the magnetic elements may be added or reduced. All such modifications are within the protection scope of the present disclosure.

In some embodiments, the loudspeaker apparatus described above may transmit the sound to the user through bone conduction and/or air conduction. When the air conduction is used to transmit the sound, the loudspeaker apparatus may include one or more sound sources. The sound source may be located at a specific position of the user's head, for example, the top of the head, the forehead, a cheek, a temple, an auricle, the back of an auricle, etc., without blocking or covering an ear canal. For the purposes of description, FIG. 22 shows a schematic diagram of transmitting the sound through the air conduction according to some embodiments of the present disclosure.

Figure 22:
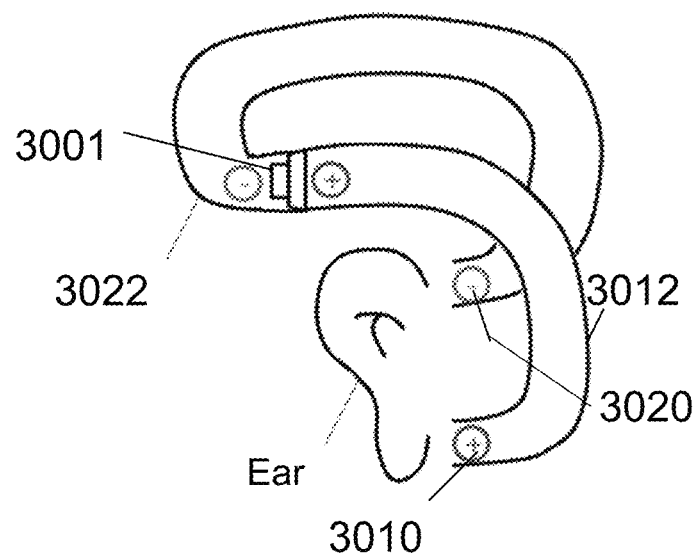
FIG. 22 is a schematic diagram of transmitting sound through air conduction according to some embodiments of the present disclosure.

As shown in FIG. 22, a sound source 3010 and a sound source 3020 may generate sound waves with opposite phases ("+" and "−" in the figure may indicate the opposite phases). For brevity, the sound sources mentioned herein may refer to sound outlets of the speaker that may output sounds. For example, the sound source 3010 and the sound source 3020 may be two sound outlets respectively located at specific positions of the loudspeaker apparatus (e.g., the earphone core housing 20 or the circuit housing 10).

In some embodiments, the sound source 3010 and the sound source 3020 may be generated by a same vibration device 3001. The vibration device 3001 may include a diaphragm (not shown in the figure). When the diaphragm is driven to vibrate by an electric signal, the front side of the diaphragm may drive the air to vibrate. The sound source 3010 may form at the sound outlet through a sound guiding channel 3012. The back of the diaphragm may drive air to vibrate, and the sound source 3020 may be formed at the sound outlet through a sound guiding channel may be formed at the sound outlet through a sound guiding channel 3022. The sound guiding channel may refer to a sound transmission route from the diaphragm to the corresponding outlet. In some embodiments, the sound guiding channel may be a route surrounded by a specific structure (e.g., the earphone core housing 20 or the circuit housing 10) of the loudspeaker apparatus. It should to be known that in some alternative embodiments, the sound source 3010 and the sound source 3020 may also be generated by different vibrating diaphragms of different vibration devices, respectively.

Among the sounds generated by the sound source 3010 and the sound source 3020, one part may be transmitted to the ears of the user to form the sound heard by the user. Another part may be transmitted to the environment to form a leaked sound. Considering that the sound source 3010 and the sound source 3020 are closer to the ears of the user, for the convenience of description, the sound transmitted to the ears of the user may be referred to as a near-field sound. The leaked sound transmitted to the environment may be referred to as a far-field sound. In some embodiments, the near-field/far-field sounds of different frequencies generated by the loudspeaker apparatus may be related to a distance between the sound source 3010 and the sound source 3020. Generally speaking, the near-field sound generated by the loudspeaker apparatus may increase as the distance between the two sound sources increases, while the generated far-field sound (the leaked sound) may increase by increasing the frequency.

For the sounds of different frequencies, the distance between the sound source 3010 and the sound source 3020 may be designed, respectively, so that a low-frequency near-field sound (e.g., a sound with a frequency of less than 800 Hz) generated by the loudspeaker apparatus may be as large as possible and a high-frequency far-field sound (e.g., a sound with a frequency greater than 2000 Hz) may be as small as possible. In order to implement the above purposes, the loudspeaker apparatus may include two or more sets of dual sound sources. Each set of the dual sound sources may include two sound sources similar to the sound source 3010 and the sound source 3020, and generate sounds with specific frequencies, respectively. Specifically, a first set of the dual sound sources may be used to generate low frequency sounds. A second set of the dual sound sources may be used to generate high frequency sounds. In order to obtain more low-frequency near-field sounds, the distance between the two sound sources in the first set of the dual sound sources may be set as a larger value. Since the low-frequency signal may have a longer wavelength, the larger distance between the two sound sources may not cause a large phase difference in the far-field, and not form excessive leaked sounds in the far-field. In order to make the high-frequency far-field sound smaller, the distance between the two sound sources in the second set of the dual sound sources may be set as a smaller value. Since the high-frequency signal has a shorter wavelength, the smaller distance between the two sound sources may avoid the generation of the large phase difference in the far-field, and thus the generation of the excessive leaked sounds may be avoided. The distance between the second set of the dual sound sources may be less than the distance between the first set of the dual sound sources.

The beneficial effects of the embodiments of the present disclosure may include but are not limited to the following. (1) the circuit housing and the protective housing may be molded separately so as to protect a control circuit or a battery from damages caused by a high temperature; (2) the first protective housing and the second protective housing may not completely cover the entire circuit housing, and components for user interaction may be exposed, which may be convenient for users to use; (3) The sound quality of the loudspeaker apparatus may be improved by adjusting the included angle between the normal line A of the panel 301 or the normal line A' of the contact surface between the panel 301 and the human skin and the straight line B where the driving force of the driving device 101 is along; (4) the housing panel and the housing back may maintain a same or substantially same vibration amplitude and phase at a higher frequency by improving the rigidity of the entire housing, thereby significantly reducing the sound leakage of the loudspeaker apparatus; (5) the sensitivity of the loudspeaker apparatus may be increased by adding the magnetic element, the magnetic guide element, and the conductive element. It should be noted that different embodiments may have different beneficial effects. In different embodiments, possible beneficial effects may be any one or a combination of the above, and may be any other beneficial effects.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "data block", "module", "engine", "unit", "component" or "system". Furthermore, aspects of the present disclosure may take the form of a computer program product embodied in one or more computer-readable media having computer-readable program code embodied thereon.

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, the numbers expressing quantities of ingredients, properties, and so forth, used to describe and claim certain embodiments of the application are to be understood as being modified in some instances by the term "about," "approximate," or "substantially" and etc. Unless otherwise stated, "about," "approximate," or "substantially" may indicate ±20% variation of the value it describes. Accordingly, in some embodiments, the numerical parameters set forth in the description and attached claims are approximations that may vary depending upon the desired properties sought to be obtained by a particular embodiment. In some embodiments, numerical data should take into account the specified significant digits and use an algorithm reserved for general digits. Notwithstanding that the numerical ranges and parameters configured to illustrate the broad scope of some embodiments of the present disclosure are approximations, the numerical values in specific examples may be as accurate as possible within a practical scope. At last, it should be understood that the embodiments described in the present application are merely illustrative of the principles of the embodiments of the present application. Other modifications that may be employed may be within the scope of the application. Thus, by way of example, but not of limitation, alternative configurations of the embodiments of the application may be utilized in accordance with the teachings herein. Accordingly, embodiments of the present disclosure are not limited to that precisely as shown and described.

What is claimed is:

1. A loudspeaker apparatus, comprising:
   at least one speaker, wherein the speaker includes an earphone core, an earphone core housing for accommodating the earphone core, the earphone core housing including a housing panel facing a human body and a housing back opposite to the housing panel; and
   a circuit housing configured to accommodate a control circuit or a battery, the control circuit or the battery driving the earphone core to vibrate to generate sound, wherein
      a vibration of the earphone core results in vibrations of the housing panel and the housing back, the vibration of the housing panel having a first phase, the vibration of the housing back having a second phase, when vibration frequencies of the housing panel and the housing back are in a range of 2000 Hz to 3000 Hz, an absolute value of a difference between the first phase and the second phase is less than 60 degrees.

2. The loudspeaker apparatus of claim 1, wherein
   the vibration of the housing panel has a first amplitude;
   the vibration of the housing back has a second amplitude; and
   a ratio of the first amplitude to the second amplitude is in a range of 0.5 to 1.5.

3. The loudspeaker apparatus of claim 1, wherein
   the vibration of the housing panel generates a first leakage sound wave;
   the vibration of the housing back generates a second leakage sound wave; and
   the first leakage sound wave and the second leakage sound wave overlap each other, the overlap reducing an amplitude of the first leakage sound wave.

4. The loudspeaker apparatus of claim 1, wherein the vibration of the earphone core is capable of generating a driving force;
   the housing panel is connected to the earphone core in a transmission manner;
   a whole or part of the housing panel contacts with or abut on a user's body to transmit sound; and
   a region on the housing panel contacting or abutting on the user's body has a normal line, a line where the driving force is along being not parallel to the normal line.

5. The loudspeaker apparatus of claim 4, wherein if the line where the driving force is along has a positive direction pointing out of the loudspeaker apparatus through the housing panel, and the normal line has a positive direction pointing out of the loudspeaker apparatus, an included angle between the line and the normal line in the positive direction is an acute angle.

6. The loudspeaker apparatus of claim 4, wherein the earphone core includes a coil and a magnetic circuit system, and an axis of the coil and the magnetic circuit system is not parallel to the normal line; and
the axis is perpendicular to a radial plane of the coil and/or a radial plane of the magnetic circuit system.

7. The loudspeaker apparatus of claim 4, wherein the driving force has components in a first quadrant and/or a third quadrant of a plane coordinate system XOY, wherein
an origin O of the plane coordinate system XOY is located on a contact surface between the loudspeaker apparatus and a human body, an X-axis of the plane coordinate system XOY is parallel to a coronal axis of the human body, an Y-axis of the plane coordinate system XOY is parallel to a sagittal axis of the human body, a positive direction of the X-axis faces toward outside of the human body, and a positive direction of the Y-axis faces toward front of the human body.

8. The loudspeaker apparatus of claim 4, wherein the region on the housing panel contacting with or abutting on the user's body includes a plane or a quasi-plane.

9. The loudspeaker apparatus of claim 1, wherein the earphone core further includes a magnetic circuit assembly generating a first magnetic field, and the magnetic circuit assembly including:
a first magnetic element generating a second magnetic field;
a first magnetic guide element; and
at least one second magnetic element configured to surround the first magnetic element, a magnetic gap being configured between the at least one second magnetic element and the first magnetic element, wherein a magnetic field strength of the first magnetic field within the magnetic gap exceeds a magnetic field strength of the second magnetic field within the magnetic gap.

10. The loudspeaker apparatus of claim 9, further comprising:
a second magnetic guide element; and
at least one third magnetic element connected with the second magnetic guide element and the at least one second magnetic element.

11. The loudspeaker apparatus of claim 10, further comprising:
at least one fourth magnetic element located below the magnetic gap, wherein the at least one fourth magnetic element is connected with the first magnetic element and the second magnetic guide element.

12. The loudspeaker apparatus of claim 10, wherein the first magnetic guide element is connected with an upper surface of the first magnetic element, the second magnetic guide element includes a baseplate and a side wall, and the first magnetic element is connected with the baseplate of the second magnetic guide element.

13. The loudspeaker apparatus of claim 10, further comprising:
at least one conductive element connected with at least one of the first magnetic element, the first magnetic guide element, or the second magnetic guide element.

14. The loudspeaker apparatus of claim 9, further comprising:
at least one fifth magnetic element connected with an upper surface of the first magnetic guide element.

15. The loudspeaker apparatus of claim 14, further comprising: a third magnetic guide element connected with an upper surface of the fifth magnetic element, wherein the third magnetic guide element is configured to suppress leakage of the magnetic field strength of the first magnetic field.

16. The loudspeaker apparatus of claim 1, further comprising:
an ear hook connected to one end of the circuit housing and at least partially covered by a first protective housing; and
a rear hook connected to another end of the circuit housing and at least partially covered by a second protective housing, wherein the first protective housing and the second protective housing at least partially cover a periphery of the circuit housing from both ends of the circuit housing in a sleeve manner, respectively.

17. The loudspeaker apparatus of claim 16, wherein the circuit housing includes a main side wall, an auxiliary side wall, and an end wall connected to each other, wherein the first protective housing and the second protective housing are coupled with each other on the main side wall and the auxiliary side wall.

18. The loudspeaker apparatus of claim 17, wherein an inner surface of the first protective housing or the second protective housing corresponding to the main side wall is provided with a positioning convex, and an outer surface of the main side wall is provided with a positioning concave matching the positioning convex.

19. The loudspeaker apparatus of claim 16, wherein a cover area of one of the first protective housing and the second protective housing on the circuit housing is greater than half of another cover area of the first protective housing and the second protective housing on the circuit housing.

20. The loudspeaker apparatus of claim 16, wherein
the rear hook further comprises a plug end facing the circuit housing, the second protective housing is placed outside at least a portion of the plug end;
the circuit housing includes a jack facing the rear hook, at least a portion of the plug end is inserted into the jack; wherein the plug end includes a slot that is perpendicular to an insertion direction of the plug end relative to the jack, and a first through hole corresponding to the slot position is disposed on a first side wall of the jack; and
the loudspeaker apparatus further comprises a fixing component, wherein the fixing component includes two pins disposed in parallel and a connecting part for connecting the pins; and the pins are inserted into the slot from outside of the plug end through the first through hole, so as to achieve a plug connection between the plug end and the jack.

* * * * *